US012631240B2

(12) United States Patent
Chen et al.

(10) Patent No.: US 12,631,240 B2
(45) Date of Patent: May 19, 2026

(54) PARABOLIC TOOTH TRACE GEAR MECHANISM WITH COMBINED TOOTH PROFILE OF END FACE CIRCULAR ARC AND PARABOLA

(71) Applicant: GUANGDONG OCEAN UNIVERSITY, Zhanjiang (CN)

(72) Inventors: Zhen Chen, Yangjiang (CN); Xiaoping Xiao, Yangjiang (CN); Yangzhi Chen, Yangjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 18/700,408

(22) PCT Filed: Sep. 25, 2023

(86) PCT No.: PCT/CN2023/120964
§ 371 (c)(1),
(2) Date: Apr. 11, 2024

(87) PCT Pub. No.: WO2024/207693
PCT Pub. Date: Oct. 10, 2024

(65) Prior Publication Data
US 2026/0016067 A1 Jan. 15, 2026

(30) Foreign Application Priority Data

Apr. 7, 2023 (CN) .......................... 202310372036.1

(51) Int. Cl.
*F16H 1/06* (2006.01)
*F16H 1/24* (2006.01)
(Continued)

(52) U.S. Cl.
CPC ................. *F16H 1/06* (2013.01); *F16H 1/24* (2013.01); *F16H 55/08* (2013.01); *F16H 55/17* (2013.01); *F16H 2055/0893* (2013.01)

(58) Field of Classification Search
CPC ... F16H 1/06; F16H 1/24; F16H 55/08; F16H 55/17; F16H 2055/0893
See application file for complete search history.

(56) References Cited

U.S. PATENT DOCUMENTS

| | | | | |
|---|---|---|---|---|
| 1,709,835 A | * | 4/1929 | Bottcher | .............. B23Q 27/006 409/26 |
| 2,059,612 A | * | 11/1936 | Schellens | ............ F16H 55/0806 74/466 |
| 6,080,199 A | * | 6/2000 | Umeyama | ............. F16H 55/088 703/2 |

FOREIGN PATENT DOCUMENTS

| CN | 1004221 B | * | 5/1989 |
|---|---|---|---|
| CN | 202418491 A | | 9/2012 |

(Continued)

OTHER PUBLICATIONS

ISR of PCT/CN2023/120964.

*Primary Examiner* — Thomas C Diaz
(74) *Attorney, Agent, or Firm* — Hemisphere Law, PLLC

(57) ABSTRACT

The present disclosure provides a parabolic tooth trace gear mechanism with a combined tooth profile of an end face circular arc and a parabola, which belongs to the field of gear transmission. The parabolic tooth trace gear mechanism with the combined tooth profile of the end face circular arc and the parabola includes a small wheel and a big wheel geared externally with parallel axes, tooth surfaces of the small wheel and the big wheel both have a parabolic tooth trace structure, and both are formed by the motion of a combined tooth profile curve of an end face along a contact point, contact lines are all parabolas after being unfolded along a cylindrical surface, and the parabola is determined by a meshing line parameter equation and basic design parameters such as a coincidence degree, the number of teeth, a transmission ratio and the like. When correctly installed, at least one pair of gear teeth of the small wheel and the big wheel, implement pure rolling meshing contact at a node. The small wheel and the big wheel rotate when being driven by a driver to implement transmission between two shafts. The parabolic tooth trace gear mechanism with the combined tooth profile of the end face circular arc and the parabola according to the present disclosure has the advantages of a low frictional wear, a high transmission efficiency, a large single-stage transmission ratio, a strong bearing capacity and the like, and can be widely applied to a transmission system design of mechanical equipment.

9 Claims, 8 Drawing Sheets

(51) Int. Cl.
    *F16H 55/08*         (2006.01)
    *F16H 55/17*         (2006.01)

(56)                 References Cited

FOREIGN PATENT DOCUMENTS

| | | | |
|---|---|---|---|
| CN | 107327559 A | 11/2017 | |
| CN | 108036038 A | 5/2018 | |
| CN | 112377594 A * | 2/2021 | ......... F16H 55/0806 |
| CN | 113944728 A | 1/2022 | |
| CN | 216447377 A | 5/2022 | |
| CN | 115013482 A | 9/2022 | |
| CN | 116480754 | 7/2023 | |
| DE | 102014109914 A | 1/2016 | |
| DE | 102018218888 A | 5/2020 | |
| LU | 85938 A1 * | 1/1986 | ............ F16H 7/023 |

* cited by examiner

PARABOLIC TOOTH TRACE GEAR MECHANISM WITH COMBINED TOOTH PROFILE OF END FACE CIRCULAR ARC AND PARABOLA

TECHNICAL FIELD

The present disclosure relates to the technical field of transmission gears, in particular to a parabolic tooth trace gear mechanism with a combined tooth profile of an end face circular arc and a parabola.

BACKGROUND

Gears are widely used in industrial equipment such as a robot joint reducer, an automobile gearbox, a wind power gearbox, a headstock of a machine tool, etc., which transmits motion and power and is regarded as the "heart" of machines. At present, it is difficult for the transmission of a spur gear, a helical gear, a circular arc gear of a conventional involute and other parallel-axis cylindrical gears to overcome the problems of transmission failure such as frictional wear, gluing and plastic deformation, thermal deformation, vibration and noise resulted from relative sliding of tooth surfaces. At the same time, a gear lubrication system increases the weight and cost of the whole machine. In extreme environments such as high temperature, low temperature, high pressure, vacuum and strong radiation, the lubricant may fail, and its discharge also results in irreversible pollution to the environment. With the rapid development of the intelligent manufacturing industry, conventional gear products cannot meet the precision transmission requirements of high-end equipment such as an automobile automatic transmission, a robot reducer, a wind power gearbox and a high-speed rail transit, and high-performance gear products rely heavily on imports. The high-performance gear design and manufacturing technology has become a key factor restricting the development of the high-end equipment manufacturing field. How to avoid relative sliding of the tooth surface and improve the gear transmission performance is one of the key problems to be solved urgently in this field.

In order to solve the problems existing in the above-mentioned parallel shaft gear transmission, researchers at home and abroad have successively invented single-arc gears, double-arc gears and circular arc tooth trace cylindrical gears. For example, Chinese patent document with application No. 202110318591.7 discloses "DOUBLE-ARC REDUCTION TRANSMISSION DEVICE WITH LESS TOOTH DIFFERENCE AND METHOD OF FORMING DOUBLE-ARC TEETH", and Chinese patent document with application No. 202123012746.9 discloses "CYLINDRICAL GEAR PAIR STRUCTURE WITH VARIABLE HYPERBOLIC circular arc TOOTH TRACE". However, the tooth profiles of the small wheel and the big wheel of double-arc gears are cut by a generating cutting method based on the same hob. In order to ensure the correct meshing of large gears and small gears, the pressure angles of two meshing points of the tooth profile of the hob are set as equal values. Therefore, the limitation of the existing double-arc gear mechanism is that its structure is not the optimal bearing design structure because the pressure angles of two meshing points of the tooth profile are defined to be equal. When the loaded mechanical equipment bears heavy load transmission, the gear teeth may be broken, which may lead to accidents. The tooth surface design of the above-mentioned hyperbolic circular arc tooth trace cylindrical gear pair is limited by machining cutter head parameters. The tooth tips at both ends will become sharp. The effective contact area of the tooth surfaces is only concentrated in the limited area of the center of the tooth width. Therefore, when applied to heavy load transmission, there is a risk of breaking gear teeth. At the same time, the relative sliding of the tooth surfaces leads to serious frictional wear.

SUMMARY

In view of this, in order to solve the problems in the prior art that the effective contact area of the tooth surfaces in the gear mechanism is only concentrated in the limited area of the center of the tooth width, there is a risk of breaking gear teeth, the relative sliding of the tooth surfaces is large, and frictional wear is serious, the embodiment of the present disclosure provides a parabolic tooth trace gear mechanism with a combined tooth profile of an end face circular arc and a parabola.

Embodiments of the present disclosure provide a parabolic tooth trace gear mechanism with a combined tooth profile of an end face circular arc and a parabola, including a gear pair consisting of a small wheel and a big wheel with parallel axes, and pure rolling meshing transmission is performed between the small wheel and the big wheel, wherein: end face tooth profile curves of the small wheel and the big wheel consist of an end face working tooth profile curve and a tooth root transition curve, and the end face tooth profile curves of the small wheel and the big wheel are symmetrical on the left and right sides; end face working tooth profiles of the small wheel and the big wheel are the combined tooth profiles of the end face circular arc and the parabola; tooth surfaces of the small wheel and the big wheel have parabolic tooth trace structures; at least one pair of gear teeth meshing points of the small wheel and the big wheel are located at a node to implement pure rolling meshing contact, and relatively rotating meshing points of the small wheel and the big wheel form meshing lines, and two contact lines are formed on the tooth surfaces of the small wheel and the big wheel, respectively.

Further, tooth surface structures of the small wheel and the big wheel are formed by the motion of the end face tooth profile curves of the small wheel and the big wheel along a tooth surface contact line with a contact point, and the contact line is an axisymmetric parabola after being unfolded along a pitch cylindrical surface of the small wheel and the big wheel.

Further, left working tooth profile curves of the end face of the small wheel and the big wheel are formed by smoothly connecting two plane curves (a circular arc and a parabola) at an inter-tooth control point $P_{bi}$, an inter-tooth control point $G_{bi}$ of a right tooth profile coincides with a node $P_i$ when the small wheel and the big wheel are installed, and the control point $G_{bi}$ is obtained by the axial symmetry of the inter-tooth control point $P_{bi}$ of a left working tooth profile curve; the shape of the end face working tooth profile curve is determined by a tooth tip control point $P_{ai}$, an inter-tooth control point $P_{bi}$ and a tooth bottom control point $P_{ci}$; specifically, the combination types of the working tooth profile curves of the small wheel and the big wheel are CP from the tooth tip to the tooth root, where C and P represent a circular arc and a parabola, respectively, the circular arc is an upper curve of the working tooth profile, and the parabola is a lower curve of the working tooth profile; the tooth root transition curve is a Hermite curve determined by the tooth bottom control point $P_{ci}$ and the tooth root control point $P_{di}$, and the tooth root transition curve is smoothly connected with the lower curve of the working tooth profile at the tooth bottom control point $P_{ci}$.

Further, the tooth tip control point $P_{ai}$ of the left working tooth profile of the small wheel and the big wheel is determined by a tooth tip circle radius $R_{ai}$ and an offset angle $\chi_{ai}$, where $\chi_{ai}$ is the angle at which a tooth tip reference point $J_{ai}$ of the small wheel and the big wheel rotates clockwise around the center of the circle; the tooth bottom control point $P_{ci}$ is determined by a tooth bottom circle radius $R_{ci}$ and an offset angle $\chi_{ci}$, where $\chi_{ci}$ is the angle at which a tooth bottom reference point $J_{ci}$ of the small wheel and the big wheel rotates clockwise around the center of the circle; wherein the tooth tip reference point $J_{ai}$ of the small wheel and the big wheel is an intersection point with the small wheel and the big wheel having an involute with the same base circle radius and an end face pressure angle and a tooth tip circle with the same radius $R_{ai}$, respectively; and the tooth bottom reference point $J_{ci}$ of the small wheel and the big wheel is an intersection point with the small wheel and the big wheel having an involute with the same base circle radius and an end face pressure angle and a tooth bottom circle with the same radius $R_{ci}$, respectively.

Further, the tooth surface contact line between the small wheel and the big wheel is determined by the following method:

in three spatial coordinate systems of $o_p$-$x_p$, $y_p$, $z_p$, $o_k$-$x_k$, $y_k$, $z_k$ and $o_g$-$x_g$, $y_g$, $z_g$, the $z_p$ axis coincides with a rotation axis of the small wheel, the $z_g$ axis coincides with a rotation axis of the big wheel, the $z_k$ axis coincides with a meshing line K-K passing through the meshing points $M_a$ and $M_b$, the $z_k$ axis is parallel to the $z_p$ and $z_g$ axes, $x_p$ coincides with the $x_g$ axis, $x_k$ is parallel to the $x_g$ axis, and the distance between $o_p$ and $o_g$ is a; the coordinate systems $o_1$-$x_1$, $y_1$, $z_1$ are fixedly connected with the small wheel, the coordinate systems $o_2$-$x_2$, $y_2$, $z_2$ are fixedly connected with the big wheel, the coordinate systems $o_1$-$x_1$, $y_1$, $z_1$ and $o_2$-$x_2$, $y_2$, $z_2$ of the small wheel and the big wheel coincide with the coordinate systems $o_p$-$x_p$, $y_p$, $z_p$ and $o_g$-$x_g$, $y_g$, $z_g$, respectively, at an initial position, at this time, the meshing points $M_a$ and $M_b$ coincide with each other, which are denoted as M, the small wheel rotates clockwise around $z_p$ axis with a uniform angular velocity $\omega_1$, the big wheel rotates counterclockwise around $z_g$ axis with a uniform angular velocity $\omega_2$, after a period of time from the initial position, the coordinate systems $o_1$-$x_1$, $y_1$, $z_1$ and $o_2$-$x_2$, $y_2$, $z_2$ rotate respectively, the small wheel rotates by an angle $\varphi_1$ around the $z_p$ axis, and the big wheel rotates by an angle $\varphi_2$ around the $z_g$ axis;

when the small wheel is in meshed transmission with the big wheel, the meshing points $M_a$ and $M_b$ are set to move up and down along the meshing line K-K from the coordinate origin $o_k$, and a parameter equation describing the motion of the meshing points is:

$$\begin{cases} x_k^{(M)} = x_k(t) = 0 \\ y_k^{(M)} = y_k(t) = 0 \\ z_k^{(M)} = z_k(t) = \pm \dfrac{b}{2}\sqrt{\dfrac{t}{\Delta t}} \end{cases} \tag{1}$$

in equation (1), t is a motion parameter variable of the meshing points $M_a$ and $M_b$, $0 \le t \le \Delta t$; b is a tooth width;

"+" corresponds to the meshing point $M_a$, "−" corresponds to the meshing point $M_b$;

in order to ensure the meshing with a fixed transmission ratio, the rotation angle of the small wheel and the big wheel and the motion of the meshing point form a linear relationship, in which the relational expression is as follows:

$$\begin{cases} \varphi_1 = k_\varphi t \\ \varphi_2 = k_\varphi t / i_{12} \end{cases} \tag{2}$$

in equation (2), $k_\varphi$ is a linear proportional coefficient of the motion of the meshing point; $i_{12}$ is a transmission ratio between the small wheel and the big wheel;

when the meshing points $M_a$ and $M_b$ move along the meshing line K-K, the meshing points simultaneously form contact lines $C_p$ and $C_g$ on the tooth surface of the small wheel and the tooth surface of the big wheel, respectively; according to the coordinate transformation, a homogeneous coordinate transformation matrix between the coordinate systems $o_p$-$x_p$, $y_p$, $z_p$, $o_k$-$x_k$, $y_k$, $z_k$ and $o_g$-$x_g$, $y_g$, $z_g$, $o_1$-$x_1$, $y_1$, $z_1$ and $o_2$-$x_2$, $y_2$, $z_2$ is obtained as follows:

$$\begin{cases} M_{1k} = M_{1p} M_{pk} \\ M_{2k} = M_{2g} M_{gk} \end{cases} \tag{3}$$

$$M_{pk} = \begin{bmatrix} 1 & 0 & 0 & -R_1 \\ 0 & 1 & 0 & 0 \\ 0 & 0 & 1 & 0 \\ 0 & 0 & 0 & 1 \end{bmatrix}, M_{1p} = \begin{bmatrix} \cos\varphi_1 & -\sin\varphi_1 & 0 & 0 \\ \sin\varphi_1 & \cos\varphi_1 & 0 & 0 \\ 0 & 0 & 1 & 0 \\ 0 & 0 & 0 & 1 \end{bmatrix} \tag{4}$$

$$M_{gk} = \begin{bmatrix} 1 & 0 & 0 & R_2 \\ 0 & 1 & 0 & 0 \\ 0 & 0 & 1 & 0 \\ 0 & 0 & 0 & 1 \end{bmatrix}, M_{2g} = \begin{bmatrix} \cos\varphi_2 & \sin\varphi_2 & 0 & 0 \\ -\sin\varphi_2 & \cos\varphi_2 & 0 & 0 \\ 0 & 0 & 1 & 0 \\ 0 & 0 & 0 & 1 \end{bmatrix} \tag{5}$$

in equations (4) and (5), $R_1$ is a pitch cylinder radius of the small wheel, $R_2$ is a pitch cylinder radius of the big wheel, and at is an end face pressure angle of the meshing point;

the parameter equation of the contact line $C_p$ of the small wheel tooth surface obtained from equations (1) and (4) is:

$$\begin{cases} x_1^{(p)} = -R_1 \cos\varphi_1 \\ y_1^{(p)} = R_1 \sin\varphi_1 \\ z_1^{(p)} = \pm \dfrac{b}{2}\sqrt{\dfrac{t}{\Delta t}} \end{cases} \tag{6}$$

the parameter equation of the contact line $C_g$ of the big wheel tooth surface is obtained from equations (1) and (5):

$$\begin{cases} x_2^{(g)} = -R_2 \cos\varphi_2 \\ y_2^{(g)} = R_2 \sin\varphi_2 \\ z_2^{(g)} = \pm \dfrac{b}{2}\sqrt{\dfrac{t}{\Delta t}} \end{cases} \tag{7}$$

Further, the specific structures of the left end face tooth profiles of the small wheel and the big wheel are determined by the following method:

a local coordinate system $S_{pbi}(o_{pbi}-x_{pbi}y_{pbi}z_{pbi})$ is established at the inter-tooth control point $P_{bi}$ of the big wheel and the small wheel, respectively, i=1, 2, where i=1 represents the small wheel, and i=2 represents the big wheel, and the parameter equation of the upper circular arc curve for the combination of working tooth profile curves is obtained as follows:

$$\begin{cases} x_{pbi}^{(Cir)} = \rho_{ai}\sin\xi_{ai} \\ y_{pbi}^{(Cir)} = \rho_{ai}\cos\xi_{ai} - \rho_{ai}, \xi_{aimin} \le \xi_{ai} \le \xi_{aimax} \\ z_{pbi}^{(Cir)} = 0 \end{cases} \tag{8}$$

in equation (8), i=1, 2, where i=1 represents a small wheel, and i=2 represents a big wheel; $\xi_{ai}$ is an angle parameter of the circular arc curve, $\xi_{aimin}$ and $\xi_{aimax}$ are the minimum value and the maximum value of the value $\xi_{ai}$ respectively, $\rho_{ai}$ is a circular arc radius of the small wheel and the big wheel, and when the offset angle $\chi_{ai}$ and the tooth tip circle radius $R_{ai}$ are determined, $\rho_{ai}$, $\xi_{aimin}$ and $\xi_{aimax}$ can be solved so as to determine the upper circular arc tooth profile curve;

the parameter equation of the lower parabola curve for the combination of working tooth profile curves is obtained as follows:

$$\begin{cases} x_{pbi}^{(Pari)} = x_{pij} \\ y_{pbi}^{(Pari)} = -a_{pi}x_{pij}^2, x_{pimin} \le x_{pi} \le x_{pimax} \\ z_{pbi}^{(Pari)} = 0 \end{cases} \tag{9}$$

in equation (9), i=1, 2, where i=1 represents a small wheel, and i=2 represents a big wheel; $a_{pi}$ is a quadratic coefficient of a parabola curve of the small wheel and the big wheel, $x_{pi}$ is a parametric variable of the coordinate axis $x_{pbi}$, and $x_{pimin}$ and $x_{pimax}$ are the minimum value and the maximum value of the value $x_{pbi}$, respectively; and when the tooth bottom circle radius $R_{ci}$ and the offset angle $\chi_{ci}$ are determined, $a_{pi}$, $x_{pimin}$ and $x_{pimax}$ can be solved so as to determine the lower parabolic tooth profile curve;

according to the coordinate transformation, a homogeneous coordinate transformation matrix between the coordinate systems $S_{pbi}(o_{pbi}-x_{pbi}y_{pbi}z_{pbi})$ and $S_{Invi}$ $(o_{Invi}-x_{Invi}y_{Invi}z_{Invi})$ is obtained as follows:

$$M_{Invipbi} = \begin{bmatrix} \sin u_i & -\cos u_i & 0 & R_i\sin\gamma_i \\ \cos u_i & \sin u_i & 0 & R_i\cos\gamma_i \\ 0 & 0 & 1 & 0 \\ 0 & 0 & 0 & 1 \end{bmatrix} \tag{10}$$

where $\gamma_i$ is an acute angle between a radial vector of a node $P_i$ and a positive direction of a coordinate axis $y_{Invi}$;

a homogeneous coordinate transformation matrix between the coordinate system $S_{Inv1}(o_{Inv1}-x_{Inv1}y_{Inv1}z_{Inv1})$ and $o_p-x_p$, $y_p$, $z_p$ is:

$$M_{pInv1} = \begin{bmatrix} -\sin(\gamma_1+\lambda_1) & -\cos(\gamma_1+\lambda_1) & 0 & 0 \\ \cos(\gamma_1+\lambda_1) & -\sin(\gamma_1+\lambda_1) & 0 & 0 \\ 0 & 0 & 1 & 0 \\ 0 & 0 & 0 & 1 \end{bmatrix} \tag{11}$$

a homogeneous coordinate transformation matrix between the coordinate system $S_{inv2}(o_{Inv2}-x_{Inv2}y_{Inv2}z_{Inv2})$ and $o_g-x_g$, $y_g$, $z_g$ is:

$$M_{gInv2} = \begin{bmatrix} \sin(\gamma_2+\lambda_2) & \cos(\gamma_2+\lambda_2) & 0 & 0 \\ -\cos(\gamma_2+\lambda_2) & \sin(\gamma_2+\lambda_2) & 0 & 0 \\ 0 & 0 & 1 & 0 \\ 0 & 0 & 0 & 1 \end{bmatrix} \tag{12}$$

where $\lambda_i$ is a central angle corresponding to the tooth thickness of a pitch circle of the small wheel and the big wheel;

Hermite curve, which is the left tooth root transition curve of the gear tooth end face of the small wheel and the big wheel, is determined by points $P_{ci}$ and $P_{ai}$ and their tangent vectors $T_{ci}$ and $T_{di}$, $P_{di}$ is determined by the tooth root circle radius $R_{ai}$ and the angle $\delta_i$, where $\delta_i$ is an acute angle included between the radial vector of point $P_{di}$ and the coordinate axis $x_k$, so as to obtain the parameter equation of the left tooth root transition curve determined by the tooth root control point $P_{ci}$ and the tooth bottom control point $P_{di}$, that is, the Hermite curve:

$$\begin{cases} x_p^{(heri)} = b_1 x_p(P_{ci}) + b_2 x_p(P_{di}) + T_H m_t[b_3 x_p(T_{ci}) + b_4 x_p(T_{di})] \\ y_p^{(heri)} = b_1 y_p(P_{ci}) + b_2 y_p(P_{di}) + T_H m_t[b_3 y_p(T_{ci}) + b_4 y_p(T_{di})] \\ z_p^{(heri)} = b_1 z_p(P_{ci}) + b_2 z_p(P_{di}) + T_H m_t[b_3 z_p(T_{ci}) + b_4 z_p(T_{di})] \end{cases} \tag{13}$$

$$\begin{cases} b_1 = 2t_H^3 - 3t_H^2 + 1 \\ b_2 = -2t_H^3 + 3t_H^2 \\ b_3 = t_H^3 - 2t_H^2 + t_H \\ b_4 = t_H^3 - t_H^2 \end{cases} \tag{14}$$

in equations (13) and (14), $x_p(P_{ci})$, $y_p(P_{ci})$ and $z_p(P_{ci})$ are three-coordinate axis components of point $P_{ci}$, respectively, $x_p(P_{di})$, $y_p(P_{di})$ and $z_p(P_{di})$ are three-coordinate axis components of point $P_{di}$, respectively, $x_p(T_{ci})$, $y_p(T_{ci})$ and $z_p(T_{ci})$ are three-coordinate axis components of a unit tangent vector $T_{ci}$ of point $P_{ci}$, respectively, $x_p(T_{di})$, $y_p(T_{di})$ and $z_p(T_{di})$ are three-coordinate axis components of a unit tangent vector $T_{di}$ of point $P_{di}$, respectively, $m_t$ is an end face module, $b_1$, $b_2$, $b_3$, $b_4$ are calculation parameters, $T_H$ is a shape control parameter of the tooth root transition curve, $0.2 \le T_H \le 1.5$, $t_H$ is a calculation parameter, $0 \le t_H \le 1$;

in all the above equations:

t is a motion parameter variables of meshing points $M_a$ and $M_b$, and $t \in [0, \Delta t]$.

$\Delta t$ is a maximum value of the motion parameter variable of the meshing point;

$k_\varphi$ is a linear proportional coefficient of the motion of the meshing point;

$m_t$ is an end face module;

$Z_1$ is the number of teeth of the small wheel;

$Z_2$ is the number of teeth of the big wheel;

$\alpha_{pi}$ is a quadratic coefficient of a parabolic tooth profile curve of the small wheel and the big wheel;

$x_{pimin}$ is a minimum value of the value $x_{pi}$;

$x_{pimax}$ is a maximum value of the value $x_{pi}$;

b is a gear tooth width of the small wheel and the big wheel;

$\alpha_t$ is an end face pressure angle;

$J_{ai}$ is a tooth tip reference point of the small wheel and the big wheel;

$J_{ci}$ is a tooth bottom reference point of the small wheel and the big wheel;

$\chi_{a1}$ is an angle at which the tooth tip reference point of the small wheel rotates clockwise around the center of the circle;

$\chi_{a2}$ is an angle at which the tooth tip reference point of the big wheel rotates clockwise around the center of the circle;

$\chi_{c1}$ is an angle at which the tooth bottom reference point of the small wheel rotates clockwise around the center of the circle;

$\chi_{c2}$ is an angle at which the tooth bottom reference point of the big wheel rotates clockwise around the center of the circle;

$\rho_{a1}$ is a radius of the upper circular arc tooth profile of the end face tooth profile of the small wheel;

$\rho_{a2}$ is a radius of the upper circular arc tooth profile of the end face tooth profile of the big wheel;

$k_c$ is a radius variation coefficient of the starting point $P_{ci}$ of the root transition curve of the small wheel and the big wheel;

$R_1$ is a pitch cylinder radius of the small wheel, $R_1=m_t Z_1/2$; (15)

$R_2$ is a pitch cylinder radius of the big wheel, $R_2=i_{12}R_1$; (16)

$i_{12}$ is a transmission ratio between the small wheel and the big wheel, $$i_{12} = \frac{Z_2}{Z_1};\qquad(17)$$

$\alpha$ is a relative position at which the axes of the small wheel and the big wheel are installed: $\alpha=R_1+R_2$; (18)

$r_{b1}$ is a radius of the base circle of the small wheel, $r_{b1}=R_1 \cos \alpha_t$; (19)

$r_{b2}$ is a radius of the base circle of the big wheel, $r_{b2}=R_2 \cos \alpha_t$; (20)

$R_{a1}$ is a radius of the tooth top circle of the small wheel, $R_{a1}=R_1+m_t$; (21)

$R_{c1}$ is a radius of the tooth bottom circle of the small wheel, that is, the radius from the starting point $P_{c1}$ of the root transition curve to the rotation center of the small wheel;

$$R_{c1} = R_1 - k_c m_t;\qquad(22)$$

$R_{d1}$ is a radius of the tooth root circle of the small wheel, $R_{d1}=R_1-1.25m_t$; (23)

$R_{a2}$ is a radius of the tooth top circle of the large wheel, $R_{a2}=R_2+m_t$; (24)

$R_{c2}$ is a radius of the tooth bottom circle of the big wheel, that is, the radius from the starting point $P_{c2}$ of the root transition curve to the rotation center of the big wheel;

$$R_{c2} = R_2 - k_c m_t;\qquad(25)$$

$R_{d2}$ is a radius of the tooth root circle of the big wheel, $R_{a2}=R_2-1.25m_t$; (26)

$\gamma_1$ is an acute angle included between the radial vector of the end face node $P_1$ of the small wheel and the positive direction of the coordinate axis $y_{Inv1}$, $$\gamma_1 = \tan^{-1} \frac{x_{Inv1}^{(P_1)}}{y_{Inv1}^{P_1}};\qquad(27)$$

$\gamma_2$ is an acute angle included between the radial vector of the end face node $P_2$ of the big wheel and the positive direction of the coordinate axis $y_{Inv2}$, $$\gamma_2 = \tan^{-1} \frac{x_{Inv2}^{(P_2)}}{y_{Inv2}^{(P_2)}};\qquad(28)$$

$\lambda_1$ is a central angle corresponding to the tooth thickness of the pitch circle of the small wheel.

$$\lambda_1 = \frac{\pi}{Z_1};\qquad(29)$$

$\lambda_2$ is a central angle corresponding to the tooth thickness of pitch circle of the big wheel, $$\lambda_2 = \frac{\pi}{Z_2};\qquad(30)$$

$\delta_1$ is an acute angle included between the radial vector of the tooth profile point $P_{d1}$ on the left end face of the small wheel and the coordinate axis $x_k$, $$\delta_1 = 0.75 \frac{2\pi}{Z_1};\qquad(31)$$

$\delta_2$ is an acute angle included between the radial vector of the tooth profile point $P_{d2}$ on the left end face of the big wheel and the coordinate axis $x_k$, $$\delta_2 = 0.75 \frac{2\pi}{Z_1};\qquad(32)$$

the coincidence degree of the parabolic tooth trace gear mechanism with the combined tooth profile of the end face circular arc and the parabola needs to be greater than 2, and the equation for calculating the coincidence degree is $$\varepsilon = \frac{\Delta t k_\varphi Z_1}{\pi}; \qquad (33)$$

according to the numerical value $\varepsilon$ of the coincidence degree, the linear proportional coefficient $k_\varphi$ and the number of the teeth $Z_1$ of the small wheel, the maximum value of the motion parameter variable of the meshing point of the parabolic tooth-line gear mechanism with the combined tooth profile of the end face circular arc and the parabola is $$\Delta t = \frac{\pi \varepsilon}{k_\varphi Z_1}; \qquad (34)$$

when the number of teeth $Z_1$, the transmission ratio $i_{12}$, the end face module $m_t$, the coincidence degree $\varepsilon$, the linear proportional coefficient $k_\varphi$, the end face pressure angle $\alpha_t$, the tooth width b, the shape control parameter of the tooth root transition curve $T_H$, the angle $\chi_{a1}$ at which the tooth tip reference point of the small wheel rotates clockwise around the center of the circle, the angle $\chi_{a2}$ at which the tooth tip reference point of the big wheel rotates clockwise around the center of the circle, the angle $\chi_{c1}$ at which the tooth bottom reference point of the small wheel rotates clockwise around the center of the circle, the angle $\chi_{c2}$ at which the tooth bottom reference point of the big wheel rotates clockwise around the center of the circle, and the radius variation coefficient $k_c$ of the starting point $P_{ci}$ of the root transition curve of the small wheel and the big wheel are determined, the maximum value $\Delta t$ of the motion parameter variable, the contact line and the meshing line of the meshing point, the combined tooth profile of the end face of the small wheel and the big wheel and their correct installation distance are also determined, and the parabolic tooth trace structure of the tooth surfaces of the small wheel and the big wheel is also determined, thus obtaining the parabolic tooth trace gear mechanism with the combined tooth profile of the end face circular arc and the parabola.

Further, the small wheel is used to connect an input shaft, and the big wheel is used to connect an output shaft.

Further, the input shaft and output shaft connected with the small wheel and the big wheel are interchangeable.

Further, one of the small wheel and the big wheel is connected with the input shaft, the input shaft is connected with a driver, and the driver is capable of driving the small wheel or the big wheel to rotate forward and backward.

The technical scheme provided by the embodiment of the present disclosure has the following beneficial effects.

1. Based on the active design of the motion law of meshing points, the parabolic tooth trace gear mechanism with the combined tooth profile of the end face circular arc and the parabola of the present disclosure constructs the contact line of meshing nodes, and the contact line is an axisymmetric parabola after the pitch cylindrical surface is unfolded, so that the theoretical values of a relative sliding velocity of all meshing points on the contact line are zero, thus effectively reducing the relative sliding and frictional wear between tooth surfaces. At the same time, the parabolic tooth trace gear mechanism with the combined tooth profile of the end face circular arc and the parabola of the present disclosure has no phenomenon that the tooth tip is sharpened. The contact area is extends across the tooth width, and a larger tooth width can be designed to transmit a larger load and achieve better motion stability. In addition, the relative difference between the maximum contact stress of the tooth surface and the maximum bending stress of the tooth root is extremely small when the parabolic tooth trace gear mechanism with the combined tooth profile of the end face circular arc and the parabola rotates forward and backward.

2. The parabolic tooth trace gear mechanism with the combined tooth profile of the end face circular arc and the parabola of the present disclosure is theoretically pure rolling meshing, in which frictional wear is small, there is no axial force, the self-centering performance is excellent, it is convenient to install, and the sensitivity to installation errors is low. Compared with the existing traditional involute herringbone gear transmission mechanism, the parabolic tooth trace gear mechanism with the combined tooth profile of the end face circular arc and the parabola of the present disclosure also has the advantages of needing no tool withdraw groove design, one-step molding, simple processing technology and convenient assembly.

3. The parabolic tooth trace gear mechanism with the combined tooth profile of the end face circular arc and the parabola is not a single circular arc isoplanar curve, but a multi-curve combined type, so that the effective regulation of a contact ellipse and a contact area is implemented, the edge contact is avoided, the relative curvature radius is increased, the contact strength of the tooth surface and the bending strength of the tooth root are improved, and the bearing capacity is improved.

4. The parabola tooth trace gear mechanism with the combined tooth profile of the end face circular arc and the parabola of the present disclosure has an axisymmetric parabola instead of an inclined straight line after the cylindrical surface of the contact line is unfolded, so that there is no axial force during transmission, the shafting installation condition is simpler, and the structure is simple.

5. The parabolic tooth trace gear mechanism with the combined tooth profile of the end face circular arc and the parabola of the present disclosure has no undercut, and the minimum number of teeth is 1. Compared with the existing parallel axis involute gear mechanism and the circular arc tooth trace cylindrical gear transmission mechanism, the present disclosure can implement single-stage large transmission to high coincidence degree transmission. At the same time, because the number of teeth can be designed to be smaller, the tooth thickness and the module can be designed to be larger when the gear pitch diameter is the same, so as to have a higher bending strength and a greater bearing capacity, and be suitable for the promotion and application in the fields of minute/micro machinery, conventional mechanical transmission and high-speed heavy-load transmission.

6. The parabolic tooth trace gear mechanism with the combined tooth profile of the end face circular arc and the parabola of the present disclosure can make the small wheel and the big wheel have a similar tooth root bending strength by adjusting the optimal design of the shape control parameter of the tooth root transition curve, thus realizing the equal strength design of the transmission mechanism and further prolonging the service life of the device.

Figure 1:
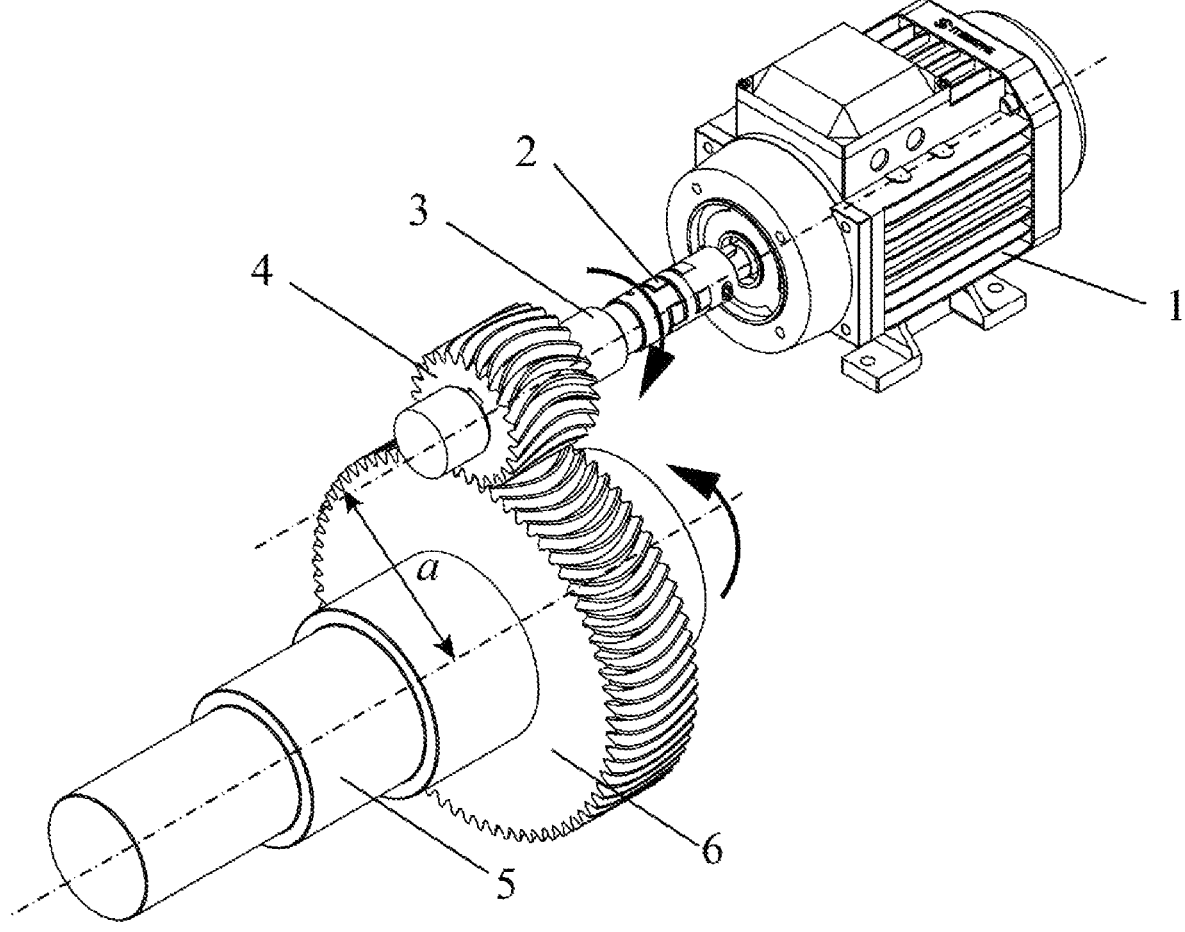
FIG. 1 is a schematic structural diagram of a parabolic tooth trace gear mechanism with a combined tooth profile of an end face circular arc and a parabola according to the present disclosure.

In the above figures: 1—driver, 2—coupling, 3—input shaft, 4—small wheel, 5—output shaft, 6—big wheel, 7—meshing line K-K, 8—small wheel pitch cylinder, 9—small wheel contact line Cp, 10—big wheel contact line Cg, 11—big wheel pitch cylinder, 12—left tooth root transition curve of a gear tooth end face of a small wheel, 13—left lower parabola of the end face working tooth profile of a big wheel, 14—left upper circular arc curve of the end face working tooth profile of a big wheel, 15—left tooth root transition curve of the end face tooth profile of a small wheel, 16—left lower parabola of the end face working tooth profile of a small wheel, 17—left upper circular arc curve of the end face working tooth profile of a big wheel

DETAILED DESCRIPTION OF THE EMBODIMENTS

In order to make the purpose, technical scheme and advantages of the present disclosure more clear, the embodiments of the present disclosure will be further described with reference to the attached drawings hereinafter. A preferred embodiment of many possible embodiments of the present disclosure is described hereinafter, which is intended to provide a basic understanding of the present disclosure, but is not intended to identify key or decisive elements of the present disclosure or limit the scope to be protected.

In all examples shown and discussed herein, any specific values should be interpreted as illustrative only and not as a limitation. Therefore, other examples of exemplary embodiments may have different values.

Techniques, methods and devices known to those skilled in the art may not be discussed in detail, but in appropriate cases, the techniques, methods and devices should be regarded as part of the authorization specification.

It should be noted that similar numbers and letters indicate similar items in the following drawings. Therefore, once an item is defined in one drawing, the item does not need to be further discussed in subsequent drawings. At the same time, it should be understood that for the convenience of description, the dimensions of various parts shown in the drawings are not drawn to scale.

In the description of the present disclosure, it should be noted that the circuits, electronic components and modules involved in the present disclosure are all in the prior art, which can be completely implemented by those skilled in the art. Needless to say, the contents protected by the present disclosure do not involve the improvement of the internal structure and method.

Further, it should be noted that unless otherwise specified and limited, the terms "installation" and "connection" should be broadly understood, for example, the connection can be fixed connection, detachable connection or integrated connection; or mechanical connection or electrical connection; or direct connection, indirect connection through an intermediate medium, or communication inside two elements. For those skilled in the art, the specific meanings of the above terms in the present disclosure can be understood in specific situations.

Embodiment 1

Figure 2:
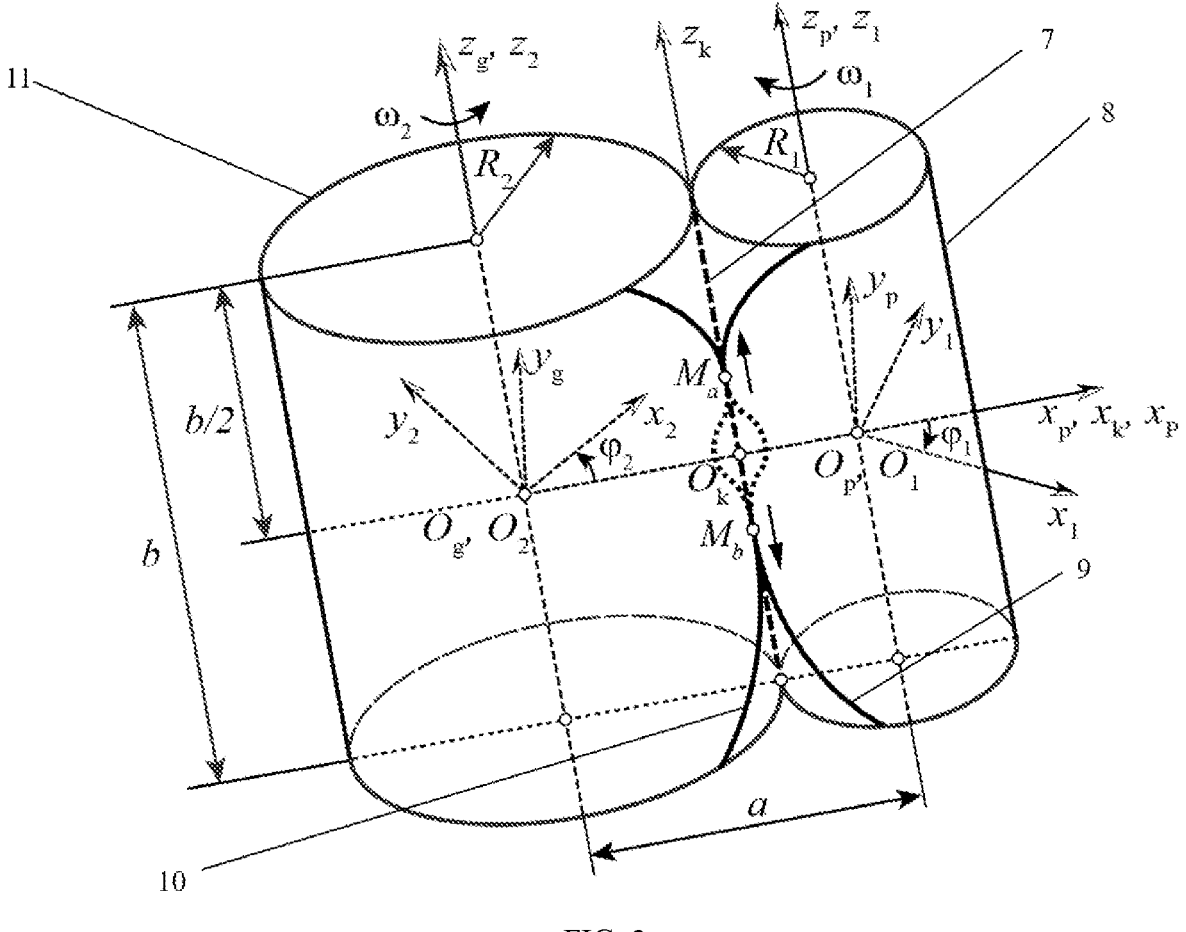
FIG. 2 is a schematic diagram of a spatial meshing coordinate system of a parabolic tooth trace gear mechanism with a combined tooth profile of an end face circular arc and a parabola according to the present disclosure.
Figure 3:
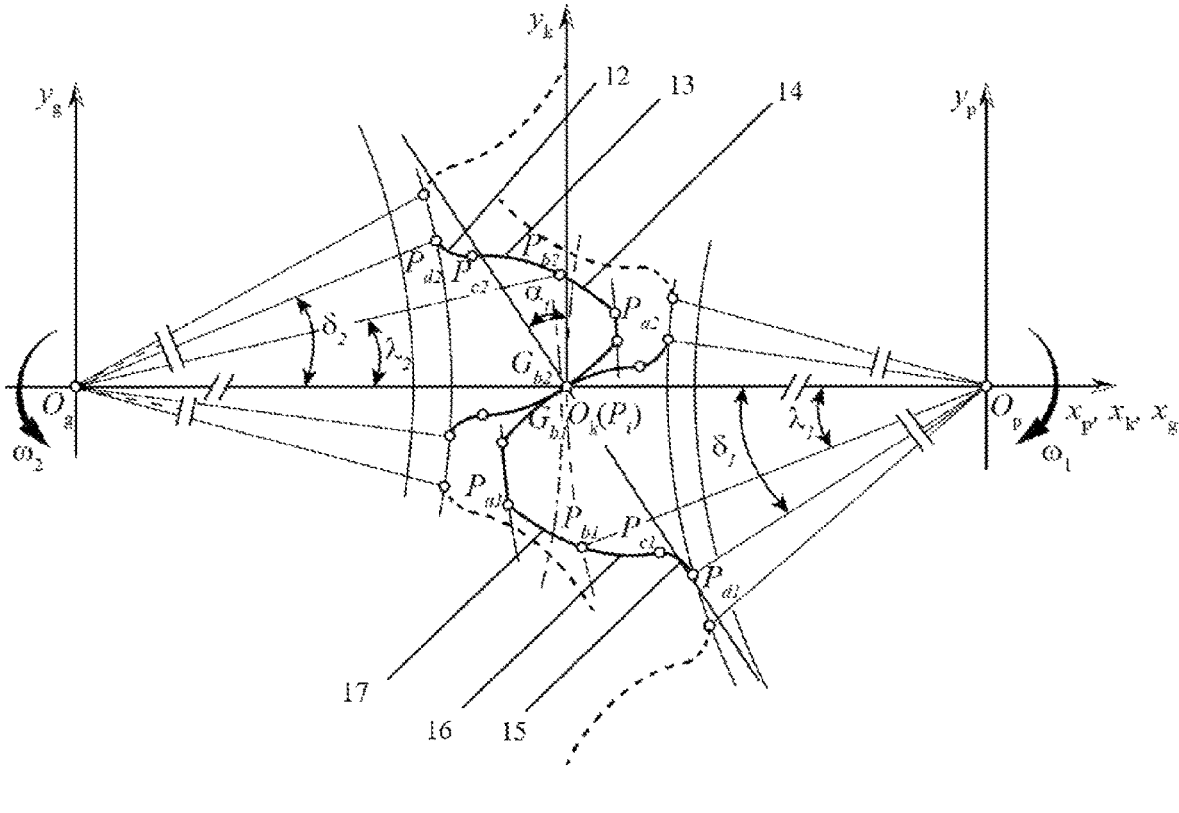
FIG. 3 is a composition structure and a coordinate system of an end face tooth profile of a big wheel and a small wheel in FIG. 1 and FIG. 2 according to the present disclosure.
Figure 4:
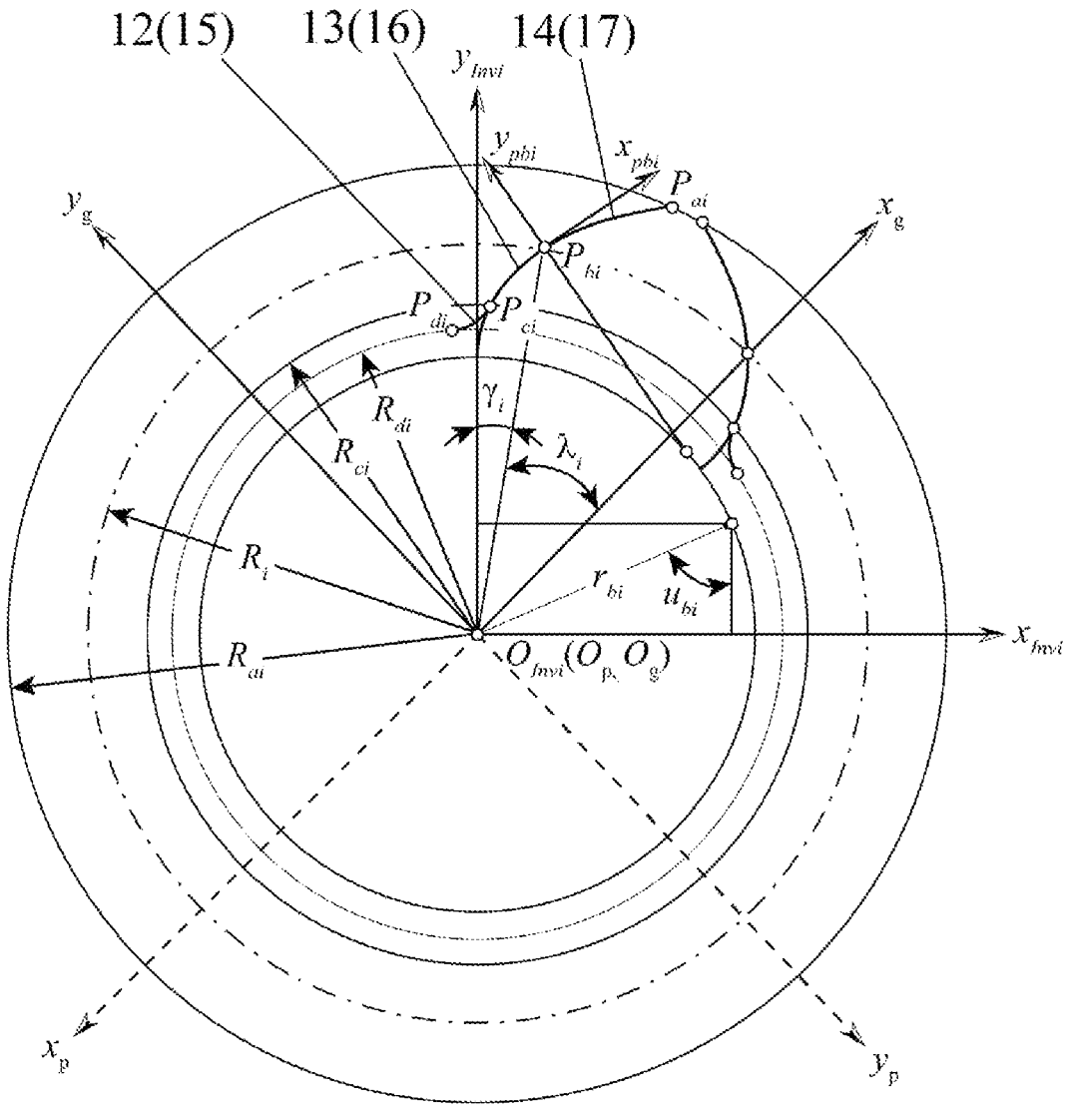
FIG. 4 is a schematic diagram of a local coordinate system relationship of a combined tooth profile according to the present disclosure.
Figure 5:
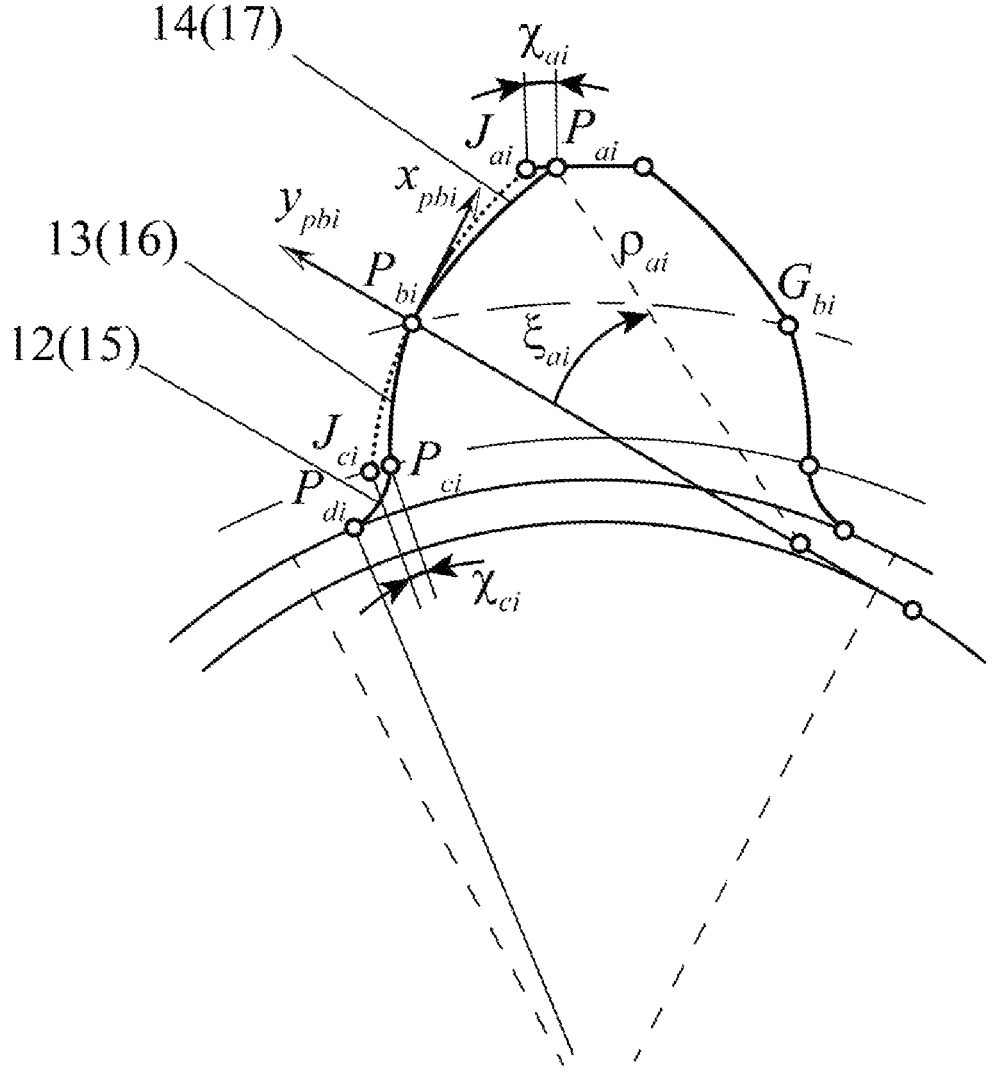
FIG. 5 is a schematic diagram of a tooth tip reference point and its rotation angle of a combined tooth profile according to the present disclosure.
Figure 6:
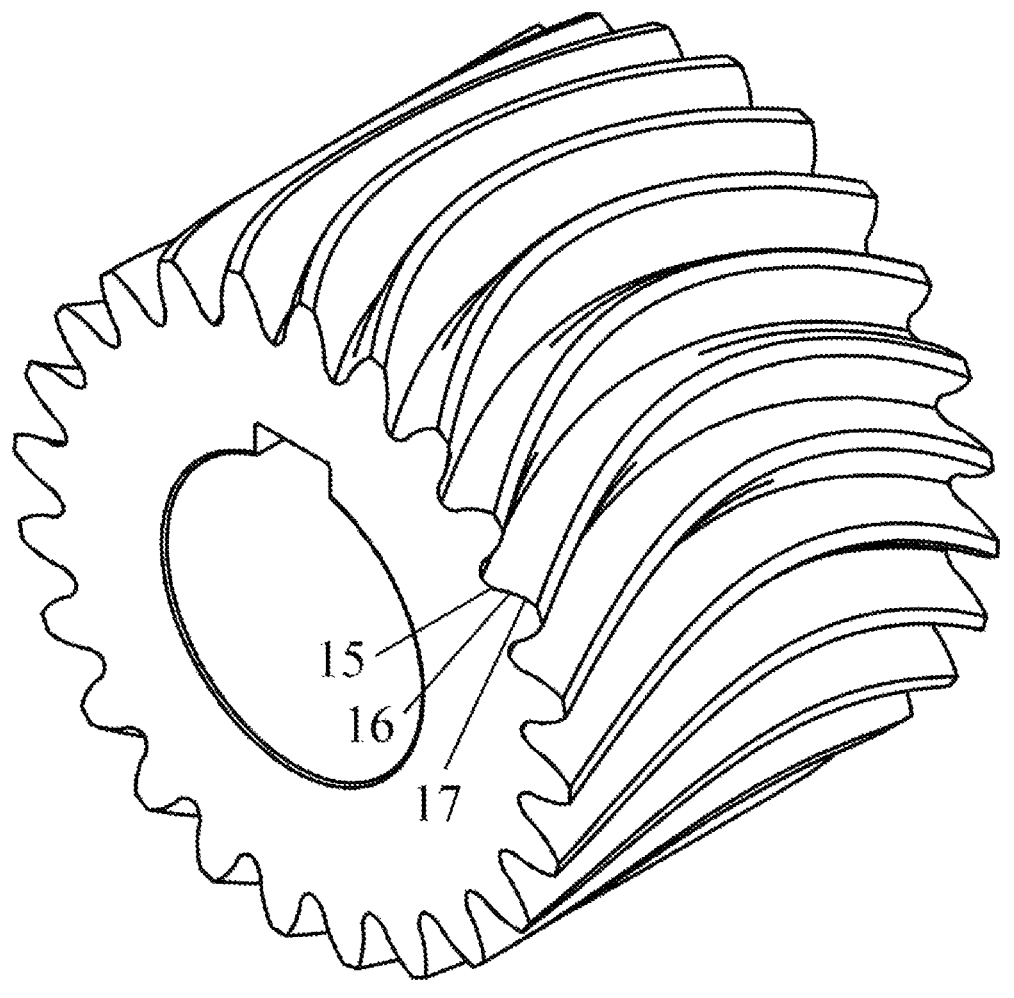
FIG. 6 is a three-dimensional space view of a small wheel in FIG. 1 according to the present disclosure.
Figure 7:
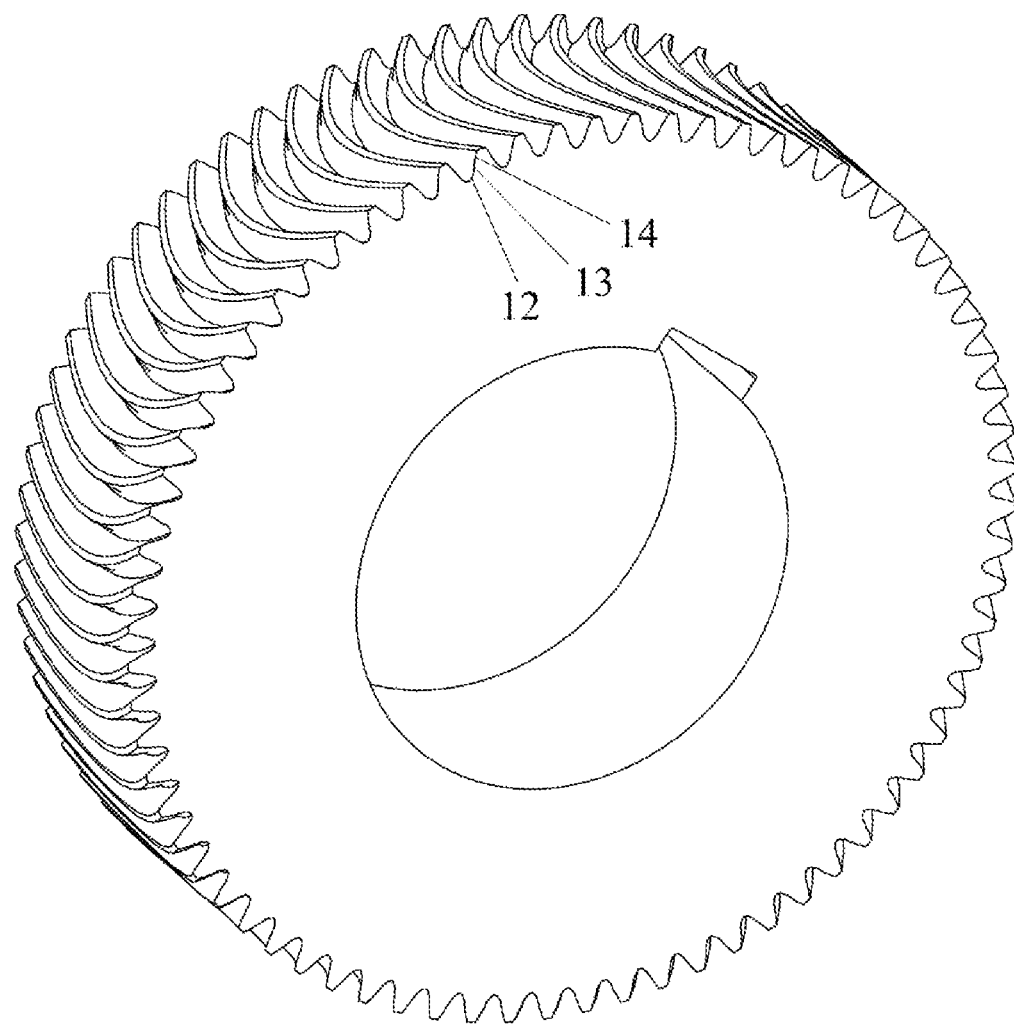
FIG. 7 is a three-dimensional space view of a bog wheel in FIG. 1 according to the present disclosure.

Referring to FIG. 1, an embodiment of the present disclosure provides a parabolic tooth trace gear mechanism with a combined tooth profile of an end face circular arc and a parabola, which is applied to the reduction transmission with a transmission ratio of 3 between parallel shafts. The coincidence degree therebetween is designed to be $\varepsilon=2.4$. Its structure is shown in FIG. 1, including a small wheel 4 and a big wheel 6. The small wheel 4 and the big wheel 6 form a gear pair. The small wheel 4 is connected with the input shaft 3. The input shaft 3 is fixedly connected with a driving motor 1 through a coupling 2. The big wheel 6 is connected with the output shaft 5, that is, the big wheel 6 is connected with the driven load through the output shaft 5. The axes of the small wheel 4 and the big wheel 6 are parallel to each other. FIG. 2 is a schematic diagram of a spatial meshing coordinate system of a parabolic tooth trace gear mechanism with a combined tooth profile of an end face circular arc and a parabola according to the present disclosure.

Referring to FIGS. 1, 2, 3, 4, 5 and 6, the pitch cylinder 8 of the small wheel has a radius of $R_1$, the tooth top circle of the small wheel has a radius of $R_{a1}$ and the tooth root circle has a radius of $R_{d1}$. The outer surface of the tooth root cylinder of the small wheel is uniformly distributed with gear teeth with a parabolic tooth trace structure. Its structure is formed by the motion of the end face tooth profile curve of the small wheel along the tooth surface contact line with the contact point, and the contact line is an axisymmetric parabola after being unfolded along the pitch cylindrical surface of the small wheel. The end face tooth profile of the gear of the small wheel is axisymmetric, that is, the left tooth profile and the right tooth profile of the end face are axisymmetric. Taking the left end face tooth profile of the small wheel as an example, the left end face tooth profile consists of the upper circular arc curve 17 of the left end face working tooth profile of the small wheel, the lower parabola 16 of the left end face working tooth profile, and the left tooth root transition curve of the end face (that is, the Hermite curve 15) from the tooth tip to the tooth root in sequence.

Referring to FIGS. 1, 2, 3, 4, 5 and 7, the pitch cylinder 11 of the big wheel has a radius of $R_2$, the tooth top circle of the big wheel has a radius of $R_{a2}$ and the tooth root circle has a radius of $R_{d2}$. The outer surface of the tooth root cylinder of the big wheel is uniformly distributed with gear teeth with a parabolic tooth trace structure. Its structure is formed by the motion of the end face tooth profile curve of the big wheel along the tooth surface contact line with the contact point, and the contact line is an axisymmetric parabola after being unfolded along the pitch cylindrical surface of the big wheel. The end face tooth profile of the gear of the big wheel is axisymmetric, that is, the left tooth profile and the right tooth profile of the end face are axisymmetric. Taking the left end face tooth profile of the big wheel as an example, the left end face tooth profile consists of the upper circular arc curve 14 of the left end face working tooth profile of the big wheel, the lower parabola 13 of the left end face working tooth profile, and the left tooth root transition curve of the end face (that is, the Hermite curve 12) from the tooth tip to the tooth root in sequence.

The working tooth profile of the end faces of the small wheel and the big wheel is the combined tooth profile of the end face circular arc and the parabola, and is axisymmetric from left to right. The right tooth profile of the end face can be obtained by the axial symmetry of the left tooth profile of the end face. Left working tooth profile curves are formed by smoothly connecting two plane curves (a circular arc and a parabola) at an inter-tooth control point $P_{bi}$, an inter-tooth control point $G_{bi}$ of a right tooth profile coincides with a node $P_i$ when the small wheel and the big wheel are installed, and the control point $G_{bi}$ is obtained by the axial symmetry of the inter-tooth control point $P_{bi}$ of a left working tooth profile curve; the shape of the end face working tooth profile curve is determined by a tooth tip control point $P_{ai}$, an inter-tooth control point $P_{bi}$ and a tooth bottom control point $P_{ci}$, specifically, the combination types of the working tooth profile curves of the small wheel and the big wheel are CP from the tooth tip to the tooth root, where "C and P" represent a circular arc (Cir) and a parabola (Par), respectively, the circular arc is an upper curve of the working tooth profile, and the parabola is a lower curve of the working tooth profile; the tooth root transition curve is a Hermite curve (Her) determined by the tooth bottom control point $P_{ci}$ and the tooth root control point $P_{ai}$, and the tooth root transition curve is smoothly connected with the lower curve of the working tooth profile at the tooth bottom control point $P_{ci}$.

The tooth tip control point $P_{ai}$ of the left working tooth profile of the small wheel and the big wheel is determined by a tooth tip circle radius $R_{ai}$ and an offset angle $\chi_{ai}$, where $\chi_{ai}$ is the angle at which a tooth tip reference point $J_{ai}$ of the small wheel and the big wheel rotates clockwise around the center of the circle; the tooth bottom control point $P_{ci}$ is determined by a tooth bottom circle radius $R_{ci}$ and an offset angle $\chi_{ci}$, where $\chi_{ci}$ is the angle at which a tooth bottom reference point $J_{ci}$ of the small wheel and the big wheel rotates clockwise around the center of the circle; wherein the tooth tip reference point $J_{ai}$ of the small wheel and the big wheel is an intersection point with the small wheel and the big wheel having an involute with the same base circle radius and an end face pressure angle and a tooth tip circle with the same radius $R_{ai}$, respectively; and the tooth bottom reference point $J_{ci}$ of the small wheel and the big wheel is an intersection point with the small wheel and the big wheel having an involute with the same base circle radius and an end face pressure angle and a tooth bottom circle with the same radius $R_{ci}$, respectively.

The small wheel 4 is connected with the input shaft 3. The input shaft 3 is fixedly connected with the driving motor 1 through the coupling 2, and rotates when being driven by the driving motor 1, so that the meshing point of at least one pair of teeth of the small wheel and the big wheel is located at the node to implement pure rolling meshing contact and implement the motion and power transmission between parallel shafts. In this embodiment, the driver 1 is a motor.

The tooth surface contact line 9, 10 between the small wheel and the big wheel is determined by the following method: in three spatial coordinate systems of $o_p$-$x_p$, $y_p$, $z_p$, $o_k$-$x_k$, $y_k$, $z_k$ and $o_g$-$x_g$, $y_g$, $z_g$, the $z_p$ axis coincides with a rotation axis of the small wheel, the $z_g$ axis coincides with a rotation axis of the big wheel, the $z_k$ axis coincides with a meshing line K-K passing through the meshing points $M_a$ and $M_b$, the $z_k$ axis is parallel to the $z_p$ and $z_g$ axes, $x_p$ coincides with the $x_g$ axis, $x_k$ is parallel to the $x_g$ axis, and the distance between $o_p$ and $o_g$ is a; the coordinate systems $o_1$-$x_1$, $y_1$, $z_1$ are fixedly connected with the small wheel, the coordinate systems $o_2$-$x_2$, $y_2$, $z_2$ are fixedly connected with the big wheel, the coordinate systems $o_1$-$x_1$, $y_1$, $z_1$ and $o_2$-$x_2$, $y_2$, $z_2$ of the small wheel and the big wheel coincide with the coordinate systems $o_p$-$x_p$, $y_p$, $z_p$ and $o_g$-$x_g$, $y_g$, $z_g$, respectively, at an initial position, at this time, the meshing points $M_a$ and $M_b$ coincide with each other, which are denoted as M, the small wheel rotates clockwise around $z_p$ axis with a uniform angular velocity $\omega_1$, the big wheel rotates counterclockwise around $z_g$ axis with a uniform angular velocity $\omega_2$, after a period of time from the initial position, the coordinate systems $o_1$-$x_1$, $y_1$, $z_1$ and $o_2$-$x_2$, $y_2$, $z_2$ rotate respectively, the small wheel rotates by an angle ($1$ around the $z_p$ axis, and the big wheel rotates by an angle $\varphi_2$ around the $z_g$ axis;

when the small wheel is in meshed transmission with the big wheel, the meshing points $M_a$ and $M_b$ are set to move up and down along the meshing line K-K from the coordinate origin $o_k$, and a parameter equation describing the motion of the meshing points is:

$$\begin{cases} x_k^{(M)} = x_k(t) = 0 \\ y_k^{(M)} = y_k(t) = 0 \\ z_k^{(M)} = z_k(t) = \pm \dfrac{b}{2}\sqrt{\dfrac{t}{\Delta t}} \end{cases} \tag{1}$$

in equation (1), t is a motion parameter variable of the meshing points $M_a$ and $M_b$, $0 \leq t \leq \Delta t$; b is a tooth width in the unit of millimeter (mm); "+" corresponds to the meshing point $M_a$, "−" corresponds to the meshing point $M_b$;

in order to ensure the meshing with a fixed transmission ratio, the rotation angle of the small wheel and the big wheel and the motion of the meshing point form a linear relationship, in which the relational expression is as follows:

$$\begin{cases} \varphi_1 = k_\varphi t \\ \varphi_2 = k_\varphi t / i_{12} \end{cases} \tag{2}$$

in equation (2), $k_\varphi$ is a linear proportional coefficient of the motion of the meshing point in the unit of radian (rad); $i_{12}$ is a transmission ratio between the small wheel and the big wheel;

when the meshing points $M_a$ and $M_b$ move along the meshing line K-K, the meshing points simultaneously form contact lines $C_p$ and $C_g$ on the tooth surface of the small wheel and the tooth surface of the big wheel, respectively; according to the coordinate transformation, a homogeneous coordinate transformation matrix between the coordinate systems $o_p$-$x_p$, $y_p$, $z_p$, $o_k$-$x_k$, $y_k$, $z_k$ and $o_g$-$x_g$, $y_g$, $z_g$, $o_1$-$x_1$, $y_1$, $z_1$ and $o_2$-$x_2$, $y_2$, $z_2$ is obtained as follows:

$$\begin{cases} M_{1k} = M_{1p}M_{pk} \\ M_{2k} = M_{2g}M_{gk} \end{cases} \quad (3)$$

$$M_{pk} = \begin{bmatrix} 1 & 0 & 0 & -R_1 \\ 0 & 1 & 0 & 0 \\ 0 & 0 & 1 & 0 \\ 0 & 0 & 0 & 1 \end{bmatrix}, M_{1p} = \begin{bmatrix} \cos\varphi_1 & -\sin\varphi_1 & 0 & 0 \\ \sin\varphi_1 & \cos\varphi_1 & 0 & 0 \\ 0 & 0 & 1 & 0 \\ 0 & 0 & 0 & 1 \end{bmatrix} \quad (4)$$

$$M_{gk} = \begin{bmatrix} 1 & 0 & 0 & R_2 \\ 0 & 1 & 0 & 0 \\ 0 & 0 & 1 & 0 \\ 0 & 0 & 0 & 1 \end{bmatrix}, M_{2g} = \begin{bmatrix} \cos\varphi_2 & \sin\varphi_2 & 0 & 0 \\ -\sin\varphi_2 & \cos\varphi_2 & 0 & 0 \\ 0 & 0 & 1 & 0 \\ 0 & 0 & 0 & 1 \end{bmatrix} \quad (5)$$

in equations (4) and (5), $R_1$ is a pitch cylinder radius of the small wheel, $R_2$ is a pitch cylinder radius of the big wheel, and at is an end face pressure angle of the meshing point;

the parameter equation of the contact line $C_p$ of the small wheel tooth surface obtained from equations (1) and (4) is:

$$\begin{cases} x_1^{(p)} = -R_1 \cos\varphi_1 \\ y_1^{(p)} = R_1 \sin\varphi_1 \\ z_1^{(p)} = \pm\frac{b}{2}\sqrt{\frac{t}{\Delta t}} \end{cases} \quad (6)$$

the parameter equation of the contact line $C_g$ of the big wheel tooth surface is obtained from equations (1) and (5):

$$\begin{cases} x_2^{(g)} = R_2 \cos\varphi_2 \\ y_2^{(g)} = -R_2 \sin\varphi_2 \\ z_2^{(g)} = \pm\frac{b}{2}\sqrt{\frac{t}{\Delta t}} \end{cases} \quad (7)$$

The specific structures of the left end face tooth profiles of the small wheel and the big wheel are determined by the following method:

a local coordinate system $S_{pbi}(o_{pbi}$-$x_{pbi}y_{pbi}z_{pbi})$ is established at the inter-tooth control point $P_{bi}$ of the big wheel and the small wheel, respectively, i=1, 2, where i=1 represents the small wheel, and i=2 represents the big wheel, and the parameter equation of the upper circular arc curve for the combination of working tooth profile curves is obtained as follows:

$$\begin{cases} x_{pbi}^{(Cir)} = \rho_{ai} \sin\xi_{ai} \\ y_{pbi}^{(Cir)} = \rho_{ai} \cos\xi_{ai} - \rho_{ai}, \xi_{aimin} \leq \xi_{ai} \leq \xi_{aimax} \\ z_{pbi}^{(Cir)} = 0 \end{cases} \quad (8)$$

in equation (8), i=1, 2, where i=1 represents a small wheel, and i=2 represents a big wheel; $\xi_{ai}$ is an angle parameter of the circular arc curve, $\xi_{aimin}$ and $\xi_{aimax}$ are the minimum value and the maximum value of the value $\xi_{ai}$ respectively, $\rho_{ai}$ is a circular arc radius of the small wheel and the big wheel, and when the offset angle $\chi_{ai}$ and the tooth tip circle radius $R_{ai}$ are determined, $\rho_{ai}$, $\xi_{aimin}$ and $\xi_{aimax}$ can be solved so as to determine the upper circular arc tooth profile curve;

the parameter equation of the lower parabola curve for the combination of working tooth profile curves is obtained as follows:

$$\begin{cases} x_{pbi}^{(Pari)} = x_{pij} \\ y_{pbi}^{(Pari)} = -a_{pi}x_{pij}^2, x_{pimin} \leq x_{pi} \leq x_{pimax} \\ z_{pbi}^{(Pari)} = 0 \end{cases} \quad (9)$$

in equation (9), i=1, 2, where i=1 represents a small wheel, and i=2 represents a big wheel; $\alpha_{pi}$ is a quadratic coefficient of a parabola curve of the small wheel and the big wheel, $x_{pi}$ is a parametric variable of the coordinate axis $x_{pbi}$, and $x_{pimin}$ and $x_{pimax}$ are the minimum value and the maximum value of the value $x_{pbi}$, respectively; and when the tooth bottom circle radius $R_{ci}$ and the offset angle $\chi_{ci}$ are determined, $\alpha_{pi}$, $x_{pimin}$ and $x_{pimax}$ can be solved so as to determine the lower parabolic tooth profile curve;

according to the coordinate transformation, a homogeneous coordinate transformation matrix between the coordinate systems $S_{pbi}(o_{pbi}$-$x_{pbi}y_{pbi}z_{pbi})$ and $S_{Invi}$ $(o_{Invi}$-$x_{Invi}y_{Invi}z_{Invi})$ is obtained as follows:

$$M_{Invipbi} = \begin{bmatrix} \sin u_i & -\cos u_i & 0 & R_i \sin\gamma_i \\ \cos u_i & \sin u_i & 0 & R_i \cos\gamma_i \\ 0 & 0 & 1 & 0 \\ 0 & 0 & 0 & 1 \end{bmatrix} \quad (10)$$

where $\gamma_i$ is an acute angle between a radial vector of a node $P_i$ and a positive direction of a coordinate axis $y_{Invi}$;

a homogeneous coordinate transformation matrix between the coordinate system $S_{Inv1}(o_{Inv1}$-$x_{Inv1}y_{Inv1}z_{Inv1})$ and $o_p$-$x_p$, $y_p$, $z_p$ is:

$$M_{pInv1} = \begin{bmatrix} -\sin(\gamma_1 + \lambda_1) & -\cos(\gamma_1 + \lambda_1) & 0 & 0 \\ \cos(\gamma_1 + \lambda_1) & -\sin(\gamma_1 + \lambda_1) & 0 & 0 \\ 0 & 0 & 1 & 0 \\ 0 & 0 & 0 & 1 \end{bmatrix} \quad (11)$$

a homogeneous coordinate transformation matrix between the coordinate system $S_{inv2}(o_{Inv2}$-$x_{inv2}y_{Inv2}z_{inv2})$ and $o_g$-$x_g$, $y_g$, $z_g$ is:

$$M_{gInv2} = \begin{bmatrix} \sin(\gamma_2 + \lambda_2) & \cos(\gamma_2 + \lambda_2) & 0 & 0 \\ -\cos(\gamma_2 + \lambda_2) & \sin(\gamma_2 + \lambda_2) & 0 & 0 \\ 0 & 0 & 1 & 0 \\ 0 & 0 & 0 & 1 \end{bmatrix} \quad (12)$$

where $\lambda_i$ is a central angle corresponding to the tooth thickness of a pitch circle of the small wheel and the big wheel;

Hermite curve (Her), which is the left tooth root transition curve of the gear tooth end face of the small wheel and the big wheel, is determined by points $P_{ci}$ and $P_{di}$ and their tangent vectors $T_{ci}$ and $T_{di}$, $P_{di}$ is determined by the tooth root circle radius $R_{di}$ and the angle $\delta_i$, where $\delta_i$ is an acute angle included between the radial vector of point $P_{di}$ and the coordinate axis $x_k$, so as to obtain the parameter equation of the left tooth root transition curve determined by the tooth root control point $P_{ci}$ and the tooth bottom control point $P_{di}$, that is, the Hermite curve:

$$\begin{cases} x_p^{(heri)} = b_1 x_p(P_{ci}) + b_2 x_p(P_{di}) + T_H m_t[b_3 x_p(T_{ci}) + b_4 x_p(T_{di})] \\ y_p^{(heri)} = b_1 y_p(P_{ci}) + b_2 y_p(P_{di}) + T_H m_t[b_3 y_p(T_{ci}) + b_4 y_p(T_{di})] \\ z_p^{(heri)} = b_1 z_p(P_{ci}) + b_2 z_p(P_{di}) + T_H m_t[b_3 z_p(T_{ci}) + b_4 z_p(T_{di})] \end{cases} \quad (13)$$

$$\begin{cases} b_1 = 2t_H^3 - 3t_H^2 + 1 \\ b_2 = -2t_H^3 + 3t_H^2 \\ b_3 = t_H^3 - 2t_H^2 + t_H \\ b_4 = t_H^3 - t_H^2 \end{cases} \quad (14)$$

in equations (13) and (14), $x_p(P_{ci})$, $y_p(P_{ci})$ and $z_p(P_{ci})$ are three-coordinate axis components of point $P_{ci}$, respectively, $x_p(P_{di})$, $y_p(P_{di})$ and $z_p(P_{di})$ are three-coordinate axis components of point $P_{di}$, respectively, $x_p(T_{ci})$, $y_p(T_{ci})$ and $z_p(T_{ci})$ are three-coordinate axis components of a unit tangent vector $T_{ci}$ of point $P_{ci}$, respectively, $x_p(T_{di})$, $y_p(T_{di})$ and $z_p(T_{di})$ are three-coordinate axis components of a unit tangent vector $T_{di}$ of point $P_{di}$, respectively, $m_t$ is an end face module, $b_1$, $b_2$, $b_3$, $b_4$ are calculation parameters, $T_H$ is a shape control parameter of the tooth root transition curve, $0.2 \leq T_H \leq 1.5$, $t_H$ is a calculation parameter, $0 \leq t_H \leq 1$;

in all the above equations:

$t$ is a motion parameter variables of meshing points $M_a$ and $M_b$, and $t \in [0, \Delta t]$.

$\Delta t$ is a maximum value of the motion parameter variable of the meshing point;

$k_\varphi$ is a linear proportional coefficient of the motion of the meshing point;

$m_t$ is an end face module;

$Z_1$ is the number of teeth of the small wheel;

$Z_2$ is the number of teeth of the big wheel;

$\alpha_{pi}$ is a quadratic coefficient of a parabolic tooth profile curve of the small wheel and the big wheel;

$x_{pimin}$ is a minimum value of the value $x_{pi}$;

$x_{pimax}$ is a maximum value of the value $x_{pi}$;

$b$ is a gear tooth width of the small wheel and the big wheel;

$\alpha_t$ is an end face pressure angle;

$J_{ai}$ is a tooth tip reference point of the small wheel and the big wheel;

$J_{ci}$ is a tooth bottom reference point of the small wheel and the big wheel;

$\chi_{a1}$ is an angle at which the tooth tip reference point of the small wheel rotates clockwise around the center of the circle;

$\chi_{a2}$ is an angle at which the tooth tip reference point of the big wheel rotates clockwise around the center of the circle;

$\chi_{c1}$ is an angle at which the tooth bottom reference point of the small wheel rotates clockwise around the center of the circle;

$\chi_{c2}$ is an angle at which the tooth bottom reference point of the big wheel rotates clockwise around the center of the circle;

$\rho_{a1}$ is a radius of the upper circular arc tooth profile of the end face tooth profile of the small wheel;

$\rho_{a2}$ is a radius of the upper circular arc tooth profile of the end face tooth profile of the big wheel;

$k_c$ is a radius variation coefficient of the starting point $P_{ci}$ of the root transition curve of the small wheel and the big wheel;

$R_1$ is a pitch cylinder radius of the small wheel, $R_1 = m_t Z_1/2$; (15)

$R_2$ is a pitch cylinder radius of the big wheel, $R_2 = i_{12} R_1$; (16)

$i_{12}$ is a transmission ratio between the small wheel and the big wheel, $$i_{12} = \frac{Z_2}{Z_1}; \quad (17)$$

$\alpha$ is a relative position at which the axes of the small wheel and the big wheel are installed: $\alpha = R_1 + R_2$; (18)

$r_{b1}$ is a radius of the base circle of the small wheel, $r_{b1} = R_1 \cos \alpha t$; (19)

$r_{b2}$ is a radius of the base circle of the big wheel, $r_{b2} = R_2 \cos \alpha_t$; (20)

$R_{a1}$ is a radius of the tooth top circle of the small wheel, $R_{a1} = R_1 + m_t$; (21)

$R_{c1}$ is a radius of the tooth bottom circle of the small wheel, that is, the radius from the starting point $P_{c1}$ of the root transition curve to the rotation center of the small wheel;

$$R_{c1} = R_1 - k_c m_t; \quad (22)$$

$R_{d1}$ is a radius of the tooth root circle of the small wheel, $R_{d1} = R_1 - 1.25 m_t$; (23)

$R_{a2}$ is a radius of the tooth top circle of the large wheel, $R_{a2} = R_2 + m_t$; (24)

$R_{c2}$ is a radius of the tooth bottom circle of the big wheel, that is, the radius from the starting point $P_{c2}$ of the root transition curve to the rotation center of the big wheel;

$$R_{c2} = R_2 - k_c m_t; \quad (25)$$

$R_{d2}$ is a radius of the tooth root circle of the big wheel, $R_{d2} = R_2 - 1.25 m_t$; (26)

$\gamma_i$ is an acute angle included between the radial vector of the end face node $P_1$ of the small wheel and the positive direction of the coordinate axis $y_{Inv1}$, $$\gamma_1 = \tan^{-1} \frac{x_{Inv1}^{(P_1)}}{y_{Inv1}^{P_1}}; \quad (27)$$

$\gamma_2$ is an acute angle included between the radial vector of the end face node $P_2$ of the big wheel and the positive direction of the coordinate axis $y_{Inv2}$, $$\gamma_2 = \tan^{-1} \frac{x_{Inv2}^{(P_2)}}{y_{Inv2}^{(P_2)}}; \quad (28)$$

$\lambda_1$ is a central angle corresponding to the tooth thickness of the pitch circle of the small wheel, $$\lambda_1 = \frac{\pi}{Z_1}; \quad (29)$$

$\lambda_2$ is a central angle corresponding to the tooth thickness of pitch circle of the big wheel, $$\lambda_2 = \frac{\pi}{Z_2}; \qquad (30)$$

$\delta_1$ is an acute angle included between the radial vector of the tooth profile point $P_{d1}$ on the left end face of the small wheel and the coordinate axis $x_k$, $$\delta_1 = 0.75\frac{2\pi}{Z_1}; \qquad (31)$$

$\delta_2$ is an acute angle included between the radial vector of the tooth profile point $P_{d2}$ on the left end face of the big wheel and the coordinate axis $x_k$, $$\delta_2 = 0.75\frac{2\pi}{Z_1}; \qquad (32)$$

the coincidence degree of the parabolic tooth trace gear mechanism with the combined tooth profile of the end face circular arc and the parabola needs to be greater than 2, and the equation for calculating the coincidence degree is $$\varepsilon = \frac{\Delta t k_\varphi Z_1}{\pi}; \qquad (33)$$

according to the numerical value $\varepsilon$ of the coincidence degree, the linear proportional coefficient $k_\varphi$ and the number of the teeth $Z_1$ of the small wheel, the maximum value of the motion parameter variable of the meshing point of the parabolic tooth-line gear mechanism with the combined tooth profile of the end face circular arc and the parabola is $$\Delta t = \frac{\pi\varepsilon}{k_\varphi Z_1}; \qquad (34)$$

when the number of teeth $Z_1$, the transmission ratio $i_{12}$, the end face module $m_t$, the coincidence degree $\varepsilon$, the linear proportional coefficient $k_\varphi$, the end face pressure angle $\alpha_t$, the tooth width b, the shape control parameter of the tooth root transition curve $T_H$, the angle $\chi_{a1}$ at which the tooth tip reference point of the small wheel rotates clockwise around the center of the circle, the angle $\chi_{a2}$ at which the tooth tip reference point of the big wheel rotates clockwise around the center of the circle, the angle $\chi_{c1}$ at which the tooth bottom reference point of the small wheel rotates clockwise around center of the circle, the angle $\chi_{c2}$ at which the tooth bottom reference point of the big wheel rotates clockwise around the center of the circle, and the radius variation coefficient $k_c$ of the starting point $P_{ci}$ of the root transition curve of the small wheel and the big wheel are determined, the maximum value $\Delta t$ of the motion parameter variable, the contact line and the meshing line 7 of the meshing point, the combined tooth profile of the end face of the small wheel and the big wheel and their correct installation distance are also determined, and the parabolic tooth trace structure of the tooth surfaces of the small wheel and the big wheel is also determined, thus obtaining the parabolic tooth trace gear mechanism with the combined tooth profile of the end face circular arc and the parabola.

In the above equation, the units of the length, the radius or the distance of each coordinate axis, such as a, b, $m_t$, $\rho_{\alpha1}$, $\rho_{\alpha2}$, $x_{pimin}$, $x_{pimax}$, $R_1$ and $R_2$, are all millimeters (mm); the units of the angles $\varphi_1$, $\varphi_2$, $\xi_{ai}$, $\xi_{aimin}$, $\xi_{aimax}$, $\delta_1$, $\delta_2$, $\chi_{a1}$, $\chi_{c1}$, $\chi_{a2}$ and $\chi_{c2}$ are radians (rad); the unit of the pressure angle $\alpha_t$ is degrees (°).

In the above equation, the values of relevant parameters are: $Z_1$=24, $i_{12}$=3, $m_t$=4 millimeters (mm), $\varepsilon$=2.4, $k_\varphi$=$\pi$ radian (rad), b=80 millimeters (mm), $\alpha_t$=20°, $T_H$=0.5, $\chi_{a1}$=0.08 rad, $\chi_{a2}$=0.04 rad, which are substituted into equations (15) to (34), so that $\Delta t$=0.1, $\alpha$=192 millimeters (mm).

Thereafter, by substituting the above numerical values into equation (1) to equation (14), the contact line parameter equation and the end face tooth profile parameter equation of the small wheel and the big wheel in this example can be obtained. Thereafter, the tooth surface structure of the gear tooth of the small wheel and the big wheel can be obtained according to the spiral motion, and the assembly can be carried out according to the correct center distance.

When the driving motor 1 drives the input shaft 3 and the small wheel 2 to rotate, the preset coincidence degree between the pair of purely rolling external gearing gears of the parabolic tooth trace gear mechanism with the combined tooth profile of the end face circular arc and the parabola is $\varepsilon$=2.4 when the small wheel 2 and the big wheel 5 are installed correctly. Two pairs of adjacent gear teeth are in the meshing state, so that at least two pairs of gear teeth are ensured to participate in meshing transmission at every moment, and thus the parabolic tooth trace gear mechanism with the combined tooth profile of the end face circular arc and the parabola is in continuous and stable meshing transmission in the rotating motion. In this embodiment, the rotation direction of the input shaft connected with the motor is clockwise, which corresponds to the deceleration transmission mode of purely rolling external gearing gears of the parabolic tooth trace gear mechanism with the combined tooth profile of the end face circular arc and the parabola, and is used to implement the deceleration and torque increase transmission of the counterclockwise rotation of the big wheel.

Embodiment 2

Figure 8:
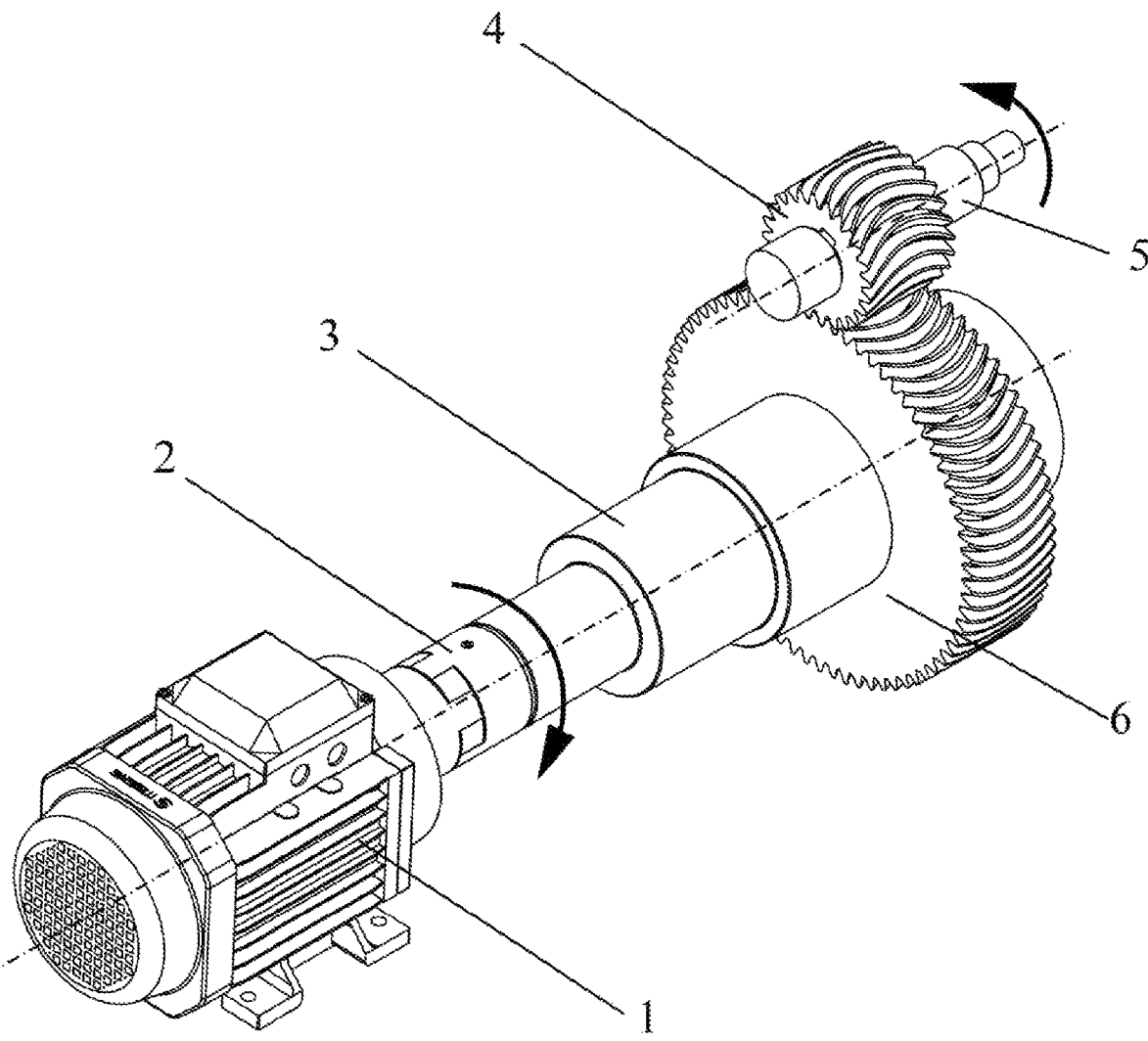
FIG. 8 is a schematic structural diagram of the present disclosure when a big wheel is connected with an input shaft to drive a small wheel to speed up transmission.

The parabolic tooth trace gear mechanism with the combined tooth profile of the end face circular arc and the parabola according to the present disclosure is applied to the speed-increasing transmission of parallel shafts. As shown in FIG. 8, the big wheel 6 is used to connect the input shaft 3. The input shaft 3 is fixedly connected with the driving motor 1 through the coupling 2. The small wheel 4 is connected with the output shaft 5, that is, the small wheel 4 is connected with the driven load through the output shaft 5. The axes of the small wheel 4 and the big wheel 6 are parallel. In this embodiment, the number of teeth of the big wheel 5 is 63, the number of teeth of the small wheel 2 is 21, and the designed coincidence degree is $\varepsilon$=2.4. When the input shaft 3 drives the big wheel 6 to rotate, because two pairs of adjacent gear teeth are in the meshing state when the big wheel 6 and the small wheel 4 are installed, the preset coincidence degree between the pair of purely rolling external gearing gears of the parabolic tooth trace gear mechanism with the combined tooth profile of the end face circular arc and the parabola is ε=2.4. Therefore, at least two pairs of gear teeth are ensured to participate in meshing transmission at every moment, and thus the parabolic tooth trace gear mechanism with the combined tooth profile of the end face circular arc and the parabola is in continuous and stable meshing transmission in the rotating motion. At this time, the speed-increasing ratio of the big wheel to the small wheel is 3, that is, the angular velocity ratio of the small wheel to the big wheel is 3.

The values of relevant parameters are: $Z_1$=21, $i_{12}$=3, $m_t$=3 millimeters (mm), ε=2.4, $k_φ$=π radian (rad), b=80 millimeters (mm), $α_t$=25°, $T_H$=0.6, $χ_{a1}$=0.06 rad, $χ_{a2}$=0.03 rad, which are substituted into equations (16) to (36), so that Δt=0.1, α=126 millimeters (mm).

Thereafter, by substituting the above numerical values into equation (1) to equation (14), the contact line parameter equation and the end face tooth profile parameter equation of the small wheel and the big wheel in this example can be obtained. Thereafter, the gear tooth structure of the small wheel and the big wheel can be obtained according to the spiral motion, and the assembly can be carried out according to the correct center distance.

In this embodiment, the rotation direction of the input shaft connected to the driver is counterclockwise, which corresponds to the speed-increasing transmission mode of the parabolic tooth trace gear mechanism with the combined tooth profile of the end face circular arc and the parabola, so as to implement the clockwise rotation transmission of the small wheel.

The design of a parabolic tooth trace gear mechanism with a combined tooth profile of an end face circular arc and a parabola is based on the active design method of meshing line parameter equations, and an end face working tooth profile is formed by combining a circular arc curve and a parabola, so that theoretical pure rolling meshing transmission is implemented, active regulation of a contact area and a contact ellipse is implemented, tooth surface friction is reduced, the comprehensive curvature radius is improved, and the tooth surface contact strength and the tooth root bending strength are increased. The parabolic tooth trace gear mechanism with the combined tooth profile of the end face circular arc and the parabola of the present disclosure has no undercut, and the minimum number of teeth is 1. Compared with the existing parallel axis involute gear mechanism, the present disclosure can implement single-stage large transmission to high coincidence degree transmission. At the same time, because the number of teeth is small, the tooth thickness can be designed to be larger when the gear pitch diameter is the same, so as to have a higher strength and a greater bearing capacity, and be suitable for the promotion and application in the fields of minute/micro machinery, conventional mechanical transmission and high-speed heavy-load transmission. The parabolic tooth trace gear mechanism with the combined tooth profile of the end face circular arc and the parabola of the present disclosure can make the small wheel and the big wheel have a similar tooth root bending strength by the optimal design of the parameter value of the tooth root transition curve, thus realizing the equal strength design of the transmission mechanism and further prolonging the service life of the device. The difference between the maximum contact stress of the tooth surface and the maximum bending stress of the tooth root is extremely small when the parabolic tooth trace gear mechanism with the combined tooth profile of the end face circular arc and the parabola rotates forward and backward. The approximate strength of forward and backward bidirectional transmission exists. In actual use, one of the small wheel 4 and the big wheel 6 is connected with the input shaft, the input shaft is connected with a driver 1, and the driver 1 is capable of driving the small wheel 4 or the big wheel 6 to rotate forward and backward.

In the present disclosure, the orientation terms front, back, up, and down involved are defined based on the position of the components in the drawings and the position of the components relative to each other, just for the sake of clarity and convenience in expressing the technical scheme. It should be understood that they are relative concepts and can change accordingly according to different ways of use and placement. The use of the orientation terms should not limit the scope to be claimed by the present disclosure.

In the case of no conflict, the above embodiments and features in the embodiments can be combined with each other.

The above is only the preferred embodiment of the present disclosure, and it is not used to limit the present disclosure. Any modification, equivalent substitution, improvement, etc. made within the spirit and principle of the present disclosure should be included in the protection scope of the present disclosure.

What is claimed is:

1. A parabolic tooth trace gear mechanism with a combined tooth profile of an end face circular arc and a parabola, comprising a gear pair consisting of a small wheel and a big wheel with parallel axes, and meshing transmission is performed between the small wheel and the big wheel, wherein: end face tooth profile curves of the small wheel and the big wheel consist of an end face working tooth profile curve and a tooth root transition curve, and the end face tooth profile curves of the small wheel and the big wheel are symmetrical on the left and right sides; end face working tooth profiles of the small wheel and the big wheel are the combined tooth profiles of the end face circular arc and the parabola; tooth surfaces of the small wheel and the big wheel have parabolic tooth trace structures; the meshing point of at least one pair of gear teeth of the small wheel and the big wheel is located at a node to implement meshing contact, and relatively rotating meshing points of the small wheel and the big wheel form meshing lines, and two contact lines are formed on the tooth surfaces of the small wheel and the big wheel, respectively.

2. The parabolic tooth trace gear mechanism with the combined tooth profile of the end face circular arc and the parabola according to claim 1, wherein tooth surface structures of the small wheel and the big wheel are formed by the motion of the end face tooth profile curves of the small wheel and the big wheel along a tooth surface contact line with a contact point, and the contact line is an axisymmetric parabola after being unfolded along a pitch cylindrical surface of the small wheel and the big wheel.

3. The parabola tooth trace gear mechanism with the combined tooth profile of the end face circular arc and the parabola according to claim 1, wherein left working tooth profile curves of the end face of the small wheel and the big wheel are formed by smoothly connecting two plane curves (a circular arc and a parabola) at an inter-tooth control point $P_{bi}$, an inter-tooth control point $G_{bi}$ of a right tooth profile coincides with a node $P_i$ when the small wheel and the big wheel are installed, and the control point $G_{bi}$ is obtained by the axial symmetry of the inter-tooth control point $P_{bi}$ of a left working tooth profile curve; the shape of the end face working tooth profile curve is determined by a tooth tip control point $P_{ai}$, an inter-tooth control point $P_{bi}$ and a tooth

— bottom control point $P_{ci}$; specifically, the combination types of the working tooth profile curves of the small wheel and the big wheel are CP from the tooth tip to the tooth root, where C and P represent a circular arc and a parabola, respectively, the circular arc is an upper curve of the working tooth profile, and the parabola is a lower curve of the working tooth profile; the tooth root transition curve is a Hermite curve determined by the tooth bottom control point $P_{ci}$ and the tooth root control point $P_{di}$, and the tooth root transition curve is smoothly connected with the lower curve of the working tooth profile at the tooth bottom control point $P_{ci}$.

4. The parabola tooth trace gear mechanism with the combined tooth profile of the end face circular arc and the parabola according to claim 3, wherein the tooth tip control point $P_{ai}$ of the left working tooth profile of the small wheel and the big wheel is determined by a tooth tip circle radius $R_{ai}$ and an offset angle $\chi_{ai}$, where $\chi_{ai}$ is the angle at which a tooth tip reference point $J_{ai}$ of the small wheel and the big wheel rotates clockwise around the center of the circle; the tooth bottom control point $P_{ci}$ is determined by a tooth bottom circle radius $R_{ci}$ and an offset angle $\chi_{ci}$, where $\chi_{ci}$ is the angle at which a tooth bottom reference point $J_{ci}$ of the small wheel and the big wheel rotates clockwise around the center of the circle; wherein the tooth tip reference point $J_{ai}$ of the small wheel and the big wheel is an intersection point with the small wheel and the big wheel having an involute with the same base circle radius and an end face pressure angle and a tooth tip circle with the same radius $R_{ai}$, respectively; and the tooth bottom reference point $J_{ci}$ of the small wheel and the big wheel is an intersection point with the small wheel and the big wheel having an involute with the same base circle radius and an end face pressure angle and a tooth bottom circle with the same radius $R_{ci}$, respectively.

5. The parabolic tooth trace gear mechanism with the combined tooth profile of the end face circular arc and the parabola according to claim 1, wherein the tooth surface contact line between the small wheel and the big wheel is determined by the following method:

in three spatial coordinate systems of $o_p$-$x_p$, $y_p$, $z_p$, $o_k$-$x_k$, $y_k$, $z_k$ and $o_g$-$x_g$, $y_g$, $z_g$, the $z_p$ axis coincides with a rotation axis of the small wheel, the $z_g$ axis coincides with a rotation axis of the big wheel, the $z_k$ axis coincides with a meshing line K-K passing through the meshing points $M_a$ and $M_b$, the $z_k$ axis is parallel to the $z_p$ and $z_g$ axes, $x_p$ coincides with the $x_g$ axis, $x_k$ is parallel to the $x_g$ axis, and the distance between $o_p$ and $o_g$ is $\alpha$, the coordinate systems $o_1$-$x_1$, $y_1$, $z_1$ are fixedly connected with the small wheel, the coordinate systems $o_2$-$x_2$, $y_2$, $y_2$ are fixedly connected with the big wheel, the coordinate systems $o_1$-$x_1$, $y_1$, $z_1$ and $o_2$-$x_2$, $y_2$, $z_2$ of the small wheel and the big wheel coincide with the coordinate systems $o_p$-$x_p$, $y_p$, $z_p$ and $o_g$-$x_g$, $y_g$, $z_g$, respectively, at an initial position, at this time, the meshing points $M_a$ and $M_b$ coincide with each other, which are denoted as M, the small wheel rotates clockwise around $z_p$ axis with a uniform angular velocity $\omega_1$, the big wheel rotates counterclockwise around $z_g$ axis with a uniform angular velocity $\omega_2$, after a period of time from the initial position, the coordinate systems $o_1$-$x_1$, $y_1$, $z_1$ and $o_2$-$x_2$, $y_2$, $y_2$ rotate respectively, the small wheel rotates by an angle $\varphi_1$ around the $z_p$ axis, and the big wheel rotates by an angle $\varphi_2$ around the $z_g$ axis;

when the small wheel is in meshed transmission with the big wheel, the meshing points $M_a$ and $M_b$ are set to move up and down along the meshing line K-K from the coordinate origin $o_k$, and a parameter equation describing the motion of the meshing points is:

$$
\begin{cases}
x_k^{(M)} = x_k(t) = 0 \\
y_k^{(M)} = y_k(t) = 0 \\
z_k^{(M)} = z_k(t) = \pm \dfrac{b}{2} \sqrt{\dfrac{t}{\Delta t}}
\end{cases} \tag{1}
$$

in equation (1), t is a motion parameter variable of the meshing points $M_a$ and $M_b$, $0 \leq t \leq \Delta t$; b is a tooth width; "+" corresponds to the meshing point $M_a$, "−" corresponds to the meshing point $M_b$;

in order to ensure the meshing with a fixed transmission ratio, the rotation angle of the small wheel and the big wheel and the motion of the meshing point form a linear relationship, in which the relational expression is as follows:

$$
\begin{cases}
\varphi_1 = k_\varphi t \\
\varphi_2 = k_\varphi t / i_{12}
\end{cases} \tag{2}
$$

in equation (2), $k_\varphi$ is a linear proportional coefficient of the motion of the meshing point; $i_{12}$ is a transmission ratio between the small wheel and the big wheel;

when the meshing points $M_a$ and $M_b$ move along the meshing line K-K, the meshing points simultaneously form contact lines $C_p$ and $C_g$ on the tooth surface of the small wheel and the tooth surface of the big wheel, respectively; according to the coordinate transformation, a homogeneous coordinate transformation matrix between the coordinate systems $o_p$-$x_p$, $y_p$, $z_p$, $o_k$-$x_k$, $y_k$, $z_k$ and $o_g$-$x_g$, $y_g$, $z_g$, $o_1$-$x_1$, $y_1$, $z_1$ and $o_2$-$x_2$, $y_2$, $z_2$ is obtained as follows:

$$
\begin{cases}
M_{1k} = M_{1p} M_{pk} \\
M_{2k} = M_{2g} M_{gk}
\end{cases} \tag{3}
$$

where $$
M_{pk} = \begin{bmatrix} 1 & 0 & 0 & -R_1 \\ 0 & 1 & 0 & 0 \\ 0 & 0 & 1 & 0 \\ 0 & 0 & 0 & 1 \end{bmatrix}, M_{1p} = \begin{bmatrix} \cos\varphi_1 & -\sin\varphi_1 & 0 & 0 \\ \sin\varphi_1 & \cos\varphi_1 & 0 & 0 \\ 0 & 0 & 1 & 0 \\ 0 & 0 & 0 & 1 \end{bmatrix} \tag{4}
$$

$$
M_{gk} = \begin{bmatrix} 1 & 0 & 0 & R_2 \\ 0 & 1 & 0 & 0 \\ 0 & 0 & 1 & 0 \\ 0 & 0 & 0 & 1 \end{bmatrix}, M_{2g} = \begin{bmatrix} \cos\varphi_2 & \sin\varphi_2 & 0 & 0 \\ -\sin\varphi_2 & \cos\varphi_2 & 0 & 0 \\ 0 & 0 & 1 & 0 \\ 0 & 0 & 0 & 1 \end{bmatrix} \tag{5}
$$

in equations (4) and (5), $R_1$ is a pitch cylinder radius of the small wheel, $R_2$ is a pitch cylinder radius of the big wheel, and $\alpha_t$ is an end face pressure angle of the meshing point;

the parameter equation of the contact line $C_p$ of the small wheel tooth surface obtained from equations (1) and (4) is:

$$
\begin{cases}
x_1^{(p)} = -R_1 \cos\varphi_1 \\
y_1^{(p)} = R_1 \sin\varphi_1 \\
z_1^{(p)} = \pm \dfrac{b}{2} \sqrt{\dfrac{t}{\Delta t}}
\end{cases} \tag{6}
$$

the parameter equation of the contact line $C_g$ of the big wheel tooth surface is obtained from equations (1) and (5):

$$\begin{cases} x_2^{(g)} = R_2\cos\varphi_2 \\ y_2^{(g)} = -R_2\sin\varphi_2 \\ z_2^{(g)} = \pm\dfrac{b}{2}\sqrt{\dfrac{t}{\Delta t}} \end{cases} \tag{7}$$

6. The parabola tooth trace gear mechanism with the combined tooth profile of the end face circular arc and the parabola according to claim 1, wherein the specific structures of the left end face tooth profiles of the small wheel and the big wheel are determined by the following method:

a local coordinate system $S_{pbi}(o_{pbi}-x_{pbi}y_{pbi}z_{pbi})$ is established at the inter-tooth control point $P_{bi}$ of the big wheel and the small wheel, respectively, i=1, 2, where i=1 represents the small wheel, and i=2 represents the big wheel, and the parameter equation of the upper circular arc curve for the combination of working tooth profile curves is obtained as follows:

$$\begin{cases} x_{pbi}^{(Cir)} = \rho_{ai}\sin\xi_{ai} \\ y_{pbi}^{(Cir)} = \rho_{ai}\cos\xi_{ai} - \rho_{ai}, \ \xi_{aimin} \le \zeta_{ai} \le \xi_{aimax} \\ z_{pbi}^{(Cir)} = 0 \end{cases} \tag{8}$$

in equation (8), i=1, 2, where i=1 represents a small wheel, and i=2 represents a big wheel; $\xi_{ai}$ is an angle parameter of the circular arc curve, $\xi_{aimin}$ and $\xi_{aimax}$ are the minimum value and the maximum value of the value $\xi_{ai}$ respectively, $\rho_{ai}$ is a circular arc radius of the small wheel and the big wheel, and when the offset angle $\chi_{ai}$ and the tooth tip circle radius $R_{ai}$ are determined, $\rho_{ai}$, $\xi_{aimin}$ and $\xi_{aimax}$ can be solved so as to determine the upper circular arc tooth profile curve;

the parameter equation of the lower parabola curve for the combination of working tooth profile curves is obtained as follows:

$$\begin{cases} x_{pbi}^{(Pari)} = x_{pij} \\ y_{pbi}^{(Pari)} = -a_{pi}x_{pij}^2, \ x_{pimin} \le x_{pi} \le x_{pimax} \\ z_{pbi}^{(Pari)} = 0 \end{cases} \tag{9}$$

in equation (9), i=1, 2, where i=1 represents a small wheel, and i=2 represents a big wheel; $\alpha_{pi}$ is a quadratic coefficient of a parabola curve of the small wheel and the big wheel, $x_{pi}$ is a parametric variable of the coordinate axis $x_{pbi}$, and $x_{pimin}$ and $x_{pimax}$ are the minimum value and the maximum value of the value $x_{pbi}$, respectively; and when the tooth bottom circle radius $R_{ci}$ and the offset angle $\chi_{ci}$ are determined, $\alpha_{pi}$, $x_{pimin}$ and $x_{pimax}$ can be solved so as to determine the lower parabolic tooth profile curve;

according to the coordinate transformation, a homogeneous coordinate transformation matrix between the coordinate systems $S_{pbi}(o_{pbi}-x_{pbi}y_{pbi}z_{pbi})$ is obtained as follows:

$$M_{Invipbi} = \begin{bmatrix} \sin u_i & -\cos u_i & 0 & R_i\sin\gamma_i \\ \cos u_i & \sin u_i & 0 & R_i\cos\gamma_i \\ 0 & 0 & 1 & 0 \\ 0 & 0 & 0 & 1 \end{bmatrix} \tag{10}$$

where $\gamma_i$ is an acute angle between a radial vector of a node $P_i$ and a positive direction of a coordinate axis $y_{Invi}$;

a homogeneous coordinate transformation matrix between the coordinate system $S_{Inv1}(o_{Inv1}-x_{Inv1}y_{Inv1}z_{Inv1})$ and $o_p-x_p, y_p, z_p$ is:

$$M_{pInv1} = \begin{bmatrix} -\sin(\gamma_1+\lambda_1) & -\cos(\gamma_1+\lambda_1) & 0 & 0 \\ \cos(\gamma_1+\lambda_1) & -\sin(\gamma_1+\lambda_1) & 0 & 0 \\ 0 & 0 & 1 & 0 \\ 0 & 0 & 0 & 1 \end{bmatrix} \tag{11}$$

a homogeneous coordinate transformation matrix between the coordinate system $S_{Inv1}(o_{Inv1}-x_{Inv2}y_{Inv2}z_{Inv2})$ and $o_g-x_g, y_g, z_g$ is:

$$M_{gInv2} = \begin{bmatrix} \sin(\gamma_2+\lambda_2) & \cos(\gamma_2+\lambda_2) & 0 & 0 \\ -\cos(\gamma_2+\lambda_2) & \sin(\gamma_2+\lambda_2) & 0 & 0 \\ 0 & 0 & 1 & 0 \\ 0 & 0 & 0 & 1 \end{bmatrix} \tag{12}$$

where $\lambda_i$ is a central angle corresponding to the tooth thickness of a pitch circle of the small wheel and the big wheel;

Hermite curve, which is the left tooth root transition curve of the gear tooth end face of the small wheel and the big wheel, is determined by points $P_{ci}$ and $P_{di}$ and their tangent vectors $T_{ci}$ and $T_{di}$, $P_{di}$ is determined by the tooth root circle radius $R_{di}$ and the angle $\delta_i$, where $\delta_i$ is an acute angle included between the radial vector of point $P_{di}$ and the coordinate axis $x_k$, so as to obtain the parameter equation of the left tooth root transition curve determined by the tooth root control point $P_{ci}$ and the tooth bottom control point $P_{di}$, that is, the Hermite curve:

$$\begin{cases} x_p^{(heri)} = b_1x_p(P_{ci}) + b_2x_p(P_{di}) + T_Hm_t[b_3x_p(T_{ci}) + b_4x_p(T_{di})] \\ y_p^{(heri)} = b_1y_p(P_{ci}) + b_2y_p(P_{di}) + T_Hm_t[b_3y_p(T_{ci}) + b_4y_p(T_{di})] \\ z_p^{(heri)} = b_1z_p(P_{ci}) + b_2z_p(P_{di}) + T_Hm_t[b_3z_p(T_{ci}) + b_4z_p(T_{di})] \end{cases} \tag{13}$$

$$\begin{cases} b_1 = 2t_H^3 - 3t_H^2 + 1 \\ b_2 = -2t_H^3 + 3t_H^2 \\ b_3 = t_H^3 - 2t_H^2 + t_H \\ b_4 = t_H^3 - t_H^2 \end{cases} \tag{14}$$

in equations (13) and (14), $x_p(P_{ci})$, $y_p(P_{ci})$ and $z_p(P_{ci})$ are three-coordinate axis components of point $P_{ci}$, respectively, $x_p(P_{di})$, $y_p(P_{di})$ and $z_p(P_{di})$ are three-coordinate axis components of point $P_{di}$, respectively, $x_p(T_{ci})$, $y_p(T_{ci})$ and $z_p(T_{ci})$ are three-coordinate axis components of a unit tangent vector $T_{ci}$ of point $P_{ci}$, respectively, $x_p(T_{di})$, $y_p(T_{di})$ and $z_p(T_{di})$ are three-coordinate axis components of a unit tangent vector $T_{di}$ of point $P_{di}$, respectively, $m_t$ is an end face module, $b_1, b_2, b_3, b_4$ are calculation parameters, $T_H$ is a shape control parameter of the tooth root transition curve, $0.2 \le T_H \le 1.5$, $t_H$ is a calculation parameter, $0 \le t_H \le 1$;

27 in all the above equations:

t is a motion parameter variables of meshing points $M_a$ and $M_b$, and $t \in [0, \Delta t]$;

$\Delta t$ is a maximum value of the motion parameter variable of the meshing point;

$k_\varphi$ is a linear proportional coefficient of the motion of the meshing point;

$m_t$ is an end face module;

$Z_1$ is the number of teeth of the small wheel;

$Z_2$ is the number of teeth of the big wheel;

$\alpha_{pi}$ is a quadratic coefficient of a parabolic tooth profile curve of the small wheel and the big wheel;

$x_{pimin}$ is a minimum value of the value $x_{pi}$;

$x_{pimax}$ is a maximum value of the value $x_{pi}$;

b is a gear tooth width of the small wheel and the big wheel;

$\alpha_z$ is an end face pressure angle;

$J_{ai}$ is a tooth tip reference point of the small wheel and the big wheel;

$J_{ci}$ is a tooth bottom reference point of the small wheel and the big wheel;

$\chi_{a1}$ is an angle at which the tooth tip reference point of the small wheel rotates clockwise around the center of the circle;

$\chi_{a2}$ is an angle at which the tooth tip reference point of the big wheel rotates clockwise around the center of the circle;

$\chi_{c1}$ is an angle at which the tooth bottom reference point of the small wheel rotates clockwise around the center of the circle;

$\chi_{c2}$ is an angle at which the tooth bottom reference point of the big wheel rotates clockwise around the center of the circle;

$\rho_{\alpha1}$ is a radius of the upper circular arc tooth profile of the end face tooth profile of the small wheel;

$\rho_{\alpha2}$ is a radius of the upper circular arc tooth profile of the end face tooth profile of the big wheel;

$k_c$ is a radius variation coefficient of the starting point $p_{ci}$ of the root transition curve of the small wheel and the big wheel;

$R_1$ is a pitch cylinder radius of the small wheel, $R_1=m_t Z_1/2$; (15)

$R_2$ is a pitch cylinder radius of the big wheel, $R_2=i_{12}R_1$; (16)

$i_{12}$ is a transmission ratio between the small wheel and the big wheel, $$i_{12} = \frac{Z_2}{Z_1};\quad (17)$$

$\alpha$ is a relative position at which the axes of the small wheel and the big wheel are installed: $\alpha=R_1+R_2$; (18)

$r_{b1}$ is a radius of the base circle of the small wheel, $r_{b1}=R_1 \cos_{\alpha t}$; (19)

$r_{b2}$ is a radius of the base circle of the big wheel, $r_{b2}=R_2 \cos_{\alpha t}$; (20)

$R_{a1}$ is a radius of the tooth top circle of the small wheel, $R_{a1}=R_1+m_t$; (21)

$R_{c1}$ is a radius of the tooth bottom circle of the small wheel, that is, the radius from the starting point $P_{c1}$ of the root transition curve to the rotation center of the small wheel;

$R_{c1}=R_1-k_c m_t$; (22)

$R_{d1}$ is a radius of the tooth root circle of the small wheel, $R_{d1}=R_1-1.25$; (23)

$R_{a2}$ is a radius of the tooth top circle of the large wheel, $R_{a2}=R_2+m_t$; (24)

$R_{c2}$ is a radius of the tooth bottom circle of the big wheel, that is, the radius from the starting point $P_{c2}$ of the root transition curve to the rotation center of the big wheel; $R_{c2}=R_2-k_c m_t$; (25)

$R_{d2}$ is a radius of the tooth root circle of the big wheel, $R_{d2}=R_2-1.25m_t$; (26)

$\gamma_1$ is an acute angle included between the radial vector of the end face node $P_1$ of the small wheel and the positive direction of the coordinate axis $y_{Inv1}$, $$\gamma_1 = \tan^{-1} \frac{x_{Inv1}^{(P_1)}}{y_{Inv1}^{P_1}};\quad (27)$$

$\gamma_2$ is an acute angle included between the radial vector of the end face node $P_2$ of the big wheel and the positive direction of the coordinate axis $y_{Inv2}$, $$\gamma_2 = \tan^{-1} \frac{x_{Inv2}^{(P_2)}}{y_{Inv2}^{(P_2)}};\quad (28)$$

$\lambda_1$ is a central angle corresponding to the tooth thickness of the pitch circle of the small wheel, $$\lambda_1 = \frac{\pi}{Z_1};\quad (29)$$

$\gamma_2$ is a central angle corresponding to the tooth thickness of pitch circle of the big wheel, $$\lambda_2 = \frac{\pi}{Z_2};\quad (30)$$

$\delta_1$ is an acute angle included between the radial vector of the tooth profile point $P_{d1}$ on the left end face of the small wheel and the coordinate axis $x_k$, $$\delta_1 = 0.75 \frac{2\pi}{Z_1};\quad (31)$$

$\delta_2$ is an acute angle included between the radial vector of the tooth profile point $P_{d2}$ on the left end face of the big wheel and the coordinate axis $x_k$, $$\delta_2 = 0.75 \frac{2\pi}{Z_1};\quad (32)$$

the coincidence degree of the parabolic tooth trace gear mechanism with the combined tooth profile of the end face circular arc and the parabola needs to be greater than 2, and the equation for calculating the coincidence degree is $$\varepsilon = \frac{\Delta t k_\varphi Z_1}{\pi};\quad (33)$$

according to the numerical value $\varepsilon$ of the coincidence degree, the linear proportional coefficient $k_\varphi$ and the number of the teeth $Z_1$ of the small wheel, the maximum value of the motion parameter variable of the meshing point of the parabolic tooth trace gear mechanism with the combined tooth profile of the end face circular arc and the parabola is $$\Delta t = \frac{\pi\varepsilon}{k_\varphi Z_1}; \tag{34}$$

when the number of teeth $Z_1$, the transmission ratio $i_{12}$, the end face module $m_t$, the coincidence degree $\varepsilon$, the linear proportional coefficient $k_\varphi$, the end face pressure angle $\alpha_t$, the tooth width b, the shape control parameter of the tooth root transition curve $T_H$, the angle $\chi_{a1}$ at which the tooth tip reference point of the small wheel rotates clockwise around the center of the circle, the angle $\chi_{a2}$ at which the tooth tip reference point of the big wheel rotates clockwise around the center of the circle, the angle $\chi_{c1}$ at which the tooth bottom reference point of the small wheel rotates clockwise around the center of the circle, the angle $\chi_{c2}$ at which the tooth bottom reference point of the big wheel rotates clockwise around the center of the circle, and the radius variation coefficient $k_c$ of the starting point $P_{ci}$ of the root transition curve of the small wheel and the big wheel are determined, the maximum value $\Delta t$ of the motion parameter variable, the contact line and the meshing line of the meshing point, the combined tooth profile of the end face of the small wheel and the big wheel and their correct installation distance are also determined, and the parabolic tooth trace structure of the tooth surfaces of the small wheel and the big wheel is also determined, thus obtaining the parabolic tooth trace gear mechanism with the combined tooth profile of the end face circular arc and the parabola.

7. The parabolic tooth trace gear mechanism with the combined tooth profile of the end face circular arc and the parabola according to claim 1, wherein the small wheel is used to connect an input shaft, and the big wheel is used to connect an output shaft.

8. The parabola tooth trace gear mechanism with the combined tooth profile of the end face circular arc and the parabola according to claim 7, wherein the input shaft and output shaft connected with the small wheel and the big wheel are interchangeable.

9. The parabolic tooth trace gear mechanism with the combined tooth profile of the end face circular arc and the parabola according to claim 1, wherein one of the small wheel and the big wheel is connected with the input shaft, the input shaft is connected with a driver, and the driver is capable of driving the small wheel or the big wheel to rotate forward and backward.

\* \* \* \* \*